US012142108B2

United States Patent
O'Hara et al.

(10) Patent No.: US 12,142,108 B2
(45) Date of Patent: Nov. 12, 2024

(54) DATA COLLECTION CLOUD SYSTEM FOR ELECTRONIC GAMING MACHINES

(71) Applicant: Aristocrat Technologies, Inc., Las Vegas, NV (US)

(72) Inventors: Jeremiah O'Hara, Las Vegas, NV (US); Anthony Patton, Las Vegas, NV (US); Bruce Urban, Las Vegas, NV (US); Rajendrasinh Jadeja, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 84 days.

(21) Appl. No.: 17/858,769

(22) Filed: Jul. 6, 2022

(65) Prior Publication Data

US 2023/0014881 A1 Jan. 19, 2023

Related U.S. Application Data

(60) Provisional application No. 63/250,959, filed on Sep. 30, 2021, provisional application No. 63/220,260, filed on Jul. 9, 2021.

(51) Int. Cl.
*G07F 17/32* (2006.01)
*G06Q 50/34* (2012.01)
(Continued)

(52) U.S. Cl.
CPC ......... *G07F 17/3225* (2013.01); *G06Q 50/34* (2013.01); *G07F 17/3223* (2013.01);
(Continued)

(58) Field of Classification Search
CPC ............ G07F 17/3225; G07F 17/3223; G07F 17/3227; G07F 17/3241; G06Q 50/34;
(Continued)

(56) References Cited

U.S. PATENT DOCUMENTS 39,370 A 8/1863 Alexander
4,582,324 A 4/1986 Koza
(Continued)

FOREIGN PATENT DOCUMENTS

AU 2019203135 A1 12/2019
GB 2573622 4/2019
(Continued)

OTHER PUBLICATIONS

Office Action (Non-Final Rejection) dated Dec. 6, 2023 for U.S. Appl. No. 17/844,466 (pp. 1-7).
(Continued)

*Primary Examiner* — Pierre E Elisca
(74) *Attorney, Agent, or Firm* — Blank Rome LLP

(57) ABSTRACT

A listening device is operatively connected to multiple network devices, and is configured to subscribe to one or more EGM data types, and receive first data from a first network device in accordance with the subscription. The listening device is also configured to generate a first data package in a form of a first data structure comprising the first data and configuration information related to the first network device, and transmit the data package across a second network to a collection server. The listening device is also configured to receive second data from a second network device in accordance with the subscription, wherein the second data comports with a second protocol that differs from the SAS protocol, and generate a second data package in the form of the first data structure comprising the second data and configuration information related to the second network device.

20 Claims, 12 Drawing Sheets

(51) Int. Cl.
    *H04L 9/40*           (2022.01)
    *H04L 67/00*         (2022.01)
    *H04L 67/125*       (2022.01)

(52) U.S. Cl.
    CPC ...... *G07F 17/3227* (2013.01); *G07F 17/3241* (2013.01); *H04L 63/0807* (2013.01); *H04L 63/0853* (2013.01); *H04L 67/125* (2013.01); *H04L 67/34* (2013.01)

(58) Field of Classification Search
    CPC ............. H04L 63/0807; H04L 63/0853; H04L 67/125; H04L 67/34; H04L 69/08
    USPC ......................................................... 463/42
    See application file for complete search history.

(56) References Cited

U.S. PATENT DOCUMENTS

| | | | |
|---|---|---|---|
| 5,283,422 A | 2/1994 | Storch | |
| 5,326,104 A | 7/1994 | Pease | |
| 5,605,334 A | 2/1997 | McCrea, Jr. | |
| 5,643,086 A | 7/1997 | Alcorn | |
| 5,735,742 A | 4/1998 | French | |
| 6,154,131 A | 11/2000 | Jones, II | |
| 6,165,069 A | 12/2000 | Sines | |
| 6,383,076 B1 | 5/2002 | Tiedeken | |
| 6,460,848 B1 | 10/2002 | Soltys | |
| 6,641,484 B2 | 11/2003 | Oles | |
| 7,003,139 B2 | 2/2006 | Endrikhovski | |
| 7,154,380 B1 | 12/2006 | Tarrab, Jr. | |
| 7,168,089 B2 | 1/2007 | Nguyen | |
| 7,316,615 B2 | 1/2008 | Soltys | |
| 7,581,256 B2 | 8/2009 | Cockerille | |
| 7,708,638 B2 | 5/2010 | Enzminger | |
| 7,736,234 B2 | 6/2010 | Cockerille | |
| 7,951,003 B2 | 5/2011 | Russell | |
| 8,157,647 B2 | 4/2012 | House | |
| 8,303,417 B2 | 11/2012 | Burke | |
| 8,366,542 B2 | 2/2013 | White | |
| 8,407,147 B2 | 3/2013 | Lenger | |
| 8,449,378 B2 | 5/2013 | Michaelson | |
| 8,608,568 B2 | 12/2013 | Carpenter | |
| 8,777,758 B2 | 7/2014 | Anderson | |
| 8,801,517 B2 | 8/2014 | Walker | |
| 8,917,971 B2 | 12/2014 | Woods | |
| 8,944,910 B1 | 2/2015 | Boyle | |
| 8,974,304 B2 | 3/2015 | Gagner | |
| 9,033,791 B2 | 5/2015 | Hamlin | |
| 9,084,937 B2 | 7/2015 | Gadher | |
| 9,117,329 B2 | 8/2015 | Osgood | |
| 9,117,339 B2 | 8/2015 | Burke | |
| 9,269,216 B2 | 2/2016 | Keilwert | |
| 9,325,203 B2 | 4/2016 | Nguyen | |
| 9,367,991 B2 | 6/2016 | Acres | |
| 9,616,324 B2 | 4/2017 | Krenn | |
| 9,865,139 B2 | 1/2018 | Walker | |
| 10,037,648 B2 | 7/2018 | Acres | |
| 10,223,679 B2 | 3/2019 | Lee | |
| 10,229,561 B2 | 3/2019 | Cage | |
| 10,275,583 B2 | 4/2019 | Leuthardt | |
| 10,297,106 B1 | 5/2019 | Simons | |
| 10,322,727 B1 | 6/2019 | Chan | |
| 10,425,426 B1 | 9/2019 | Simons | |
| 10,497,204 B2 | 12/2019 | Weber | |
| 10,530,569 B2 | 1/2020 | Bisti | |
| 10,549,202 B2 | 2/2020 | Mccoy | |
| 10,706,678 B2 | 7/2020 | Nguyen | |
| 10,741,017 B2 | 8/2020 | Silva | |
| 10,850,204 B2 | 12/2020 | Bruzzo | |
| 10,943,438 B2 | 3/2021 | Cage | |
| 10,949,417 B2 | 3/2021 | Kurian | |
| 10,950,081 B2 | 3/2021 | Baker | |
| 10,991,201 B2 | 4/2021 | McDowell | |
| 11,004,304 B2 | 5/2021 | Nguyen | |
| 11,023,981 B2 | 6/2021 | Hu | |
| 11,045,726 B2 | 6/2021 | Hennessy | |
| 11,107,321 B2 | 8/2021 | Ovalle | |
| 11,158,170 B2 | 10/2021 | Thomas | |
| 11,159,334 B2 | 10/2021 | Kuzma | |
| 11,159,945 B2 | 10/2021 | Obaidi | |
| 11,189,130 B2 | 11/2021 | Purohit | |
| 11,195,371 B2 | 12/2021 | Purohit | |
| 11,232,442 B2 | 1/2022 | Liu | |
| 11,245,529 B2 * | 2/2022 | Clark | .................. H04L 63/0428 |
| 11,288,921 B2 | 3/2022 | Haishima | |
| 11,308,761 B2 | 4/2022 | Purohit | |
| 11,373,446 B1 | 6/2022 | Beisel | |
| 11,373,480 B2 | 6/2022 | Taylor | |
| 11,380,070 B2 | 7/2022 | Koidahl | |
| 11,688,233 B2 | 6/2023 | Acres | |
| 11,783,669 B2 | 10/2023 | Schwartz | |
| 2001/0019966 A1 | 9/2001 | Idaka | |
| 2002/0025850 A1 | 2/2002 | Hafezi | |
| 2002/0032051 A1 | 3/2002 | Stockdale | |
| 2002/0142831 A1 | 10/2002 | Mattice | |
| 2002/0152120 A1 | 10/2002 | Howington | |
| 2003/0032485 A1 | 2/2003 | Cockerille | |
| 2003/0060283 A1 | 3/2003 | Rowe | |
| 2004/0048669 A1 | 3/2004 | Rowe | |
| 2004/0235562 A1 | 11/2004 | Kiely | |
| 2005/0043086 A1 | 2/2005 | Schneider | |
| 2005/0130728 A1 | 6/2005 | Nguyen | |
| 2006/0035713 A1 | 2/2006 | Cockerille | |
| 2006/0063595 A1 | 3/2006 | Kondo | |
| 2006/0166732 A1 | 7/2006 | Lechner | |
| 2006/0189382 A1 | 8/2006 | Muir | |
| 2006/0205488 A1 | 9/2006 | Gagner | |
| 2006/0264253 A1 | 11/2006 | Trobia | |
| 2008/0058059 A1 | 3/2008 | Fitzsimons | |
| 2008/0182667 A1 | 7/2008 | Davis | |
| 2008/0214300 A1 | 9/2008 | Williams | |
| 2008/0235746 A1 | 9/2008 | Peters | |
| 2009/0042640 A1 | 2/2009 | Gagner | |
| 2009/0181720 A1 | 7/2009 | Marsico | |
| 2009/0197660 A1 | 8/2009 | Cramer | |
| 2009/0247293 A1 | 10/2009 | Lenger | |
| 2010/0093428 A1 | 4/2010 | Mattice | |
| 2010/0203961 A1 | 8/2010 | Burke | |
| 2010/0234094 A1 | 9/2010 | Gagner | |
| 2010/0248812 A1 | 9/2010 | Pacey | |
| 2010/0255902 A1 | 10/2010 | Goldstein | |
| 2010/0291994 A1 | 11/2010 | Denham | |
| 2011/0089730 A1 | 4/2011 | Higgs | |
| 2011/0102546 A1 | 5/2011 | Dhuse | |
| 2011/0111838 A1 | 5/2011 | Bauer | |
| 2011/0117984 A1 | 5/2011 | Shimabukuro | |
| 2011/0124405 A1 | 5/2011 | Okada | |
| 2012/0028703 A1 | 2/2012 | Anderson | |
| 2012/0035751 A1 | 2/2012 | Dimitriadis | |
| 2012/0129596 A1 | 5/2012 | Thackston | |
| 2012/0193956 A1 | 8/2012 | Baker | |
| 2012/0229508 A1 | 9/2012 | Wigdor | |
| 2013/0072304 A1 | 3/2013 | Brosnan | |
| 2013/0084959 A1 | 4/2013 | Nelson | |
| 2013/0084960 A1 | 4/2013 | Frady | |
| 2013/0084973 A1 | 4/2013 | Frady | |
| 2013/0085001 A1 | 4/2013 | Anderson | |
| 2013/0137498 A1 | 5/2013 | Willyard | |
| 2013/0190095 A1 | 7/2013 | Gadher | |
| 2013/0196755 A1 | 8/2013 | Nelson | |
| 2014/0219492 A1 | 8/2014 | Pelliccio | |
| 2014/0235324 A1 | 8/2014 | Ryan | |
| 2014/0256450 A1 | 9/2014 | Bleich | |
| 2014/0274309 A1 | 9/2014 | Nguyen | |
| 2014/0323194 A1 | 10/2014 | Keilwert | |
| 2014/0324749 A1 | 10/2014 | Peters | |
| 2015/0279155 A1 | 10/2015 | Chun | |
| 2015/0302690 A1 | 10/2015 | Hutchinson-Kay | |
| 2016/0012465 A1 | 1/2016 | Sharp | |
| 2016/0023116 A1 | 1/2016 | Wire | |
| 2016/0292558 A1 | 10/2016 | Vienneau | |
| 2016/0335840 A1 | 11/2016 | Acres | |
| 2017/0061731 A1 | 3/2017 | Colvin | |
| 2017/0161991 A1 | 6/2017 | Ayati | |

(56) References Cited

U.S. PATENT DOCUMENTS

| | | |
|---|---|---|
| 2017/0278304 A1 | 9/2017 | Hildreth |
| 2017/0287593 A1 | 10/2017 | Ovalle |
| 2017/0293669 A1 | 10/2017 | Madhavan |
| 2017/0300876 A1 | 10/2017 | Musiala, Jr. |
| 2017/0316644 A1 | 11/2017 | Arnone |
| 2018/0019867 A1 | 1/2018 | Davis |
| 2018/0096175 A1 | 4/2018 | Schmeling |
| 2018/0096752 A1 | 4/2018 | Ovalle |
| 2018/0114403 A1 | 4/2018 | Jayachandran |
| 2018/0370476 A1 | 12/2018 | Alequin |
| 2019/0028264 A1 | 1/2019 | Bisti |
| 2019/0028265 A1 | 1/2019 | Bisti |
| 2019/0066488 A1 | 2/2019 | Locke |
| 2019/0096170 A1 | 3/2019 | Lewis |
| 2019/0096191 A1 | 3/2019 | Stuehling |
| 2019/0102986 A1 | 4/2019 | Nelson |
| 2019/0109714 A1* | 4/2019 | Clark ................. H04L 67/565 |
| 2019/0122300 A1 | 4/2019 | O'Brien |
| 2019/0122492 A1 | 4/2019 | Nguyen |
| 2019/0122495 A1 | 4/2019 | Yi |
| 2019/0130698 A1 | 5/2019 | Simons |
| 2019/0130701 A1 | 5/2019 | Simons |
| 2019/0143207 A1 | 5/2019 | Kumar |
| 2019/0163672 A1 | 5/2019 | Shmueli |
| 2019/0180558 A1 | 6/2019 | Merati |
| 2019/0188653 A1 | 6/2019 | Khaund |
| 2019/0205894 A1 | 7/2019 | Gonzales, Jr. |
| 2019/0221076 A1 | 7/2019 | Simons |
| 2019/0280875 A1 | 9/2019 | Ragnoni |
| 2019/0289019 A1 | 9/2019 | Thekadath |
| 2019/0295371 A1 | 9/2019 | Simons |
| 2019/0296915 A1 | 9/2019 | Lancashire |
| 2019/0314726 A1 | 10/2019 | Masini |
| 2019/0321722 A1 | 10/2019 | Hennessy |
| 2019/0325700 A1 | 10/2019 | Jayachandran |
| 2019/0333285 A1 | 10/2019 | Delia |
| 2019/0352125 A1 | 11/2019 | Wooten |
| 2019/0355209 A1 | 11/2019 | Sorey |
| 2019/0373015 A1 | 12/2019 | Kozloski |
| 2020/0020194 A1 | 1/2020 | Higgins |
| 2020/0021600 A1 | 1/2020 | Simons |
| 2020/0027315 A1 | 1/2020 | Cotton |
| 2020/0051368 A1 | 2/2020 | Pustizzi |
| 2020/0066093 A1 | 2/2020 | Schwartz |
| 2020/0090463 A1 | 3/2020 | Mohrhardt |
| 2020/0097862 A1 | 3/2020 | Arora |
| 2020/0105096 A1 | 4/2020 | Ovalle |
| 2020/0110855 A1 | 4/2020 | Cunningham |
| 2020/0145217 A1* | 5/2020 | Clark ................. H04L 63/105 |
| 2020/0152005 A1 | 5/2020 | Higgins |
| 2020/0168036 A1 | 5/2020 | Schwartz |
| 2020/0168038 A1 | 5/2020 | Schwartz |
| 2020/0189420 A1 | 6/2020 | Urano |
| 2020/0193764 A1 | 6/2020 | Ovalle |
| 2020/0211325 A1 | 7/2020 | Kaizerman |
| 2020/0380817 A1 | 12/2020 | Purohit |
| 2020/0410433 A1 | 12/2020 | Rahilly |
| 2020/0412813 A1* | 12/2020 | Mong ................. B61L 27/04 |
| 2021/0037013 A1 | 2/2021 | Salkintzis |
| 2021/0174634 A1 | 6/2021 | Purohit |
| 2021/0233351 A1 | 7/2021 | Meltzer |
| 2021/0241566 A1 | 8/2021 | Russ |
| 2021/0327208 A1 | 10/2021 | Colvin |
| 2021/0335085 A1 | 10/2021 | Froy, Jr. |
| 2021/0350659 A1 | 11/2021 | Purohit |
| 2022/0006831 A1 | 1/2022 | Garg |
| 2022/0030000 A1 | 1/2022 | Lee |
| 2022/0383695 A1 | 12/2022 | Demarco |
| 2023/0130583 A1 | 4/2023 | Shaffer, Jr. |
| 2023/0306816 A1 | 9/2023 | Purohit |

FOREIGN PATENT DOCUMENTS

| | | |
|---|---|---|
| WO | 2019089774 A1 | 5/2019 |
| WO | 2019089778 A1 | 5/2019 |

OTHER PUBLICATIONS

Office Action (Notice of Allowance and Fees Due (PTOL-85)) dated May 10, 2023 for U.S. Appl. No. 17/543,339 (pp. 1-5).
Office Action (Notice of Allowance and Fees Due (PTOL-85)) dated Jun. 7, 2023 for U.S. Appl. No. 17/697,637 (pp. 1-9).
Office Action (Notice of Allowance and Fees Due (PTOL-85)) dated Jan. 5, 2023 for U.S. Appl. No. 17/222,763 (pp. 1-7).
Office Action (Non-Final Rejection) dated Jan. 18, 2023 for U.S. Appl. No. 17/671,388 (pp. 1-6).
Office Action (Notice of Allowance and Fees Due (PTOL-85)) dated Feb. 10, 2023 for U.S. Appl. No. 17/721,152 (pp. 1-10).
Office Action (Non-Final Rejection) dated Mar. 16, 2023 for U.S. Appl. No. 17/529,050 (pp. 1-13).
Office Action (Non-Final Rejection) dated Mar. 16, 2023 for U.S. Appl. No. 17/529,069 (pp. 1-13).
Office Action (Non-Final Rejection) dated Apr. 12, 2023 for U.S. Appl. No. 17/543,339 (pp. 1-5).
Office Action (Notice of Allowance and Fees Due (PTOL-85)) dated Apr. 14, 2023 for U.S. Appl. No. 17/529,069 (pp. 1-9).
Notice of Allowance dated Apr. 14, 2023 for U.S. Appl. No. 17/529,050 (pp. 1-9).
Office Action (Notice of Allowance and Fees Due (PTOL-85)) dated Apr. 26, 2023 for U.S. Appl. No. 17/671,388 (pp. 1-9).
Australian Examination Report No. 1 issued in App. No. AU2019219795, dated Oct. 16, 2023, 4 pages.
Brendan Koemer, "Russians Engineer A Brilliant Slot Machine Cheat—And Casinos Have No Fix", https://www.wired.com/2017/02/russians-engineer-brilliant-slot-machine-cheat-casinos-no-fix/, Nov. 6, 2018, 14 pages.
Brendan Koemer, "Meet Alex, The Russian Casino Hacker Who Makes Millions Targeting Slot Machines", https://Wired.com/story/meet-alex-the-russian-casino-hacker-who-makes-millions-targeting-slot-machines/, Nov. 6, 2018, 18 pages.
Office Action dated Mar. 8, 2021 for U.S. Appl. No. 16/415,654 (pp. 1-12).
Office Action (Notice of Allowance and Fees Due (PTOL-85)) dated Nov. 26, 2021 for U.S. Appl. No. 16/778,743 (pp. 1-9).
Office Action (Notice of Allowance and Fees Due (PTOL-85)) dated Aug. 25, 2021 for U.S. Appl. No. 16/415,654 (pp. 1-10).
Office Action (Notice of Allowance and Fees Due (PTOL-85)) dated Oct. 6, 2021 for U.S. Appl. No. 16/864,800 (pp. 1-9).
Office Action (Notice of Allowance and Fees Due (PTOL-85)) dated Dec. 8, 2021 for U.S. Appl. No. 16/778,768 (pp. 1-8).
Office Action (Notice of Allowance and Fees Due (PTOL-85)) dated Dec. 21, 2021 for U.S. Appl. No. 16/837,655 (pp. 1-8).
Office Action (Notice of Allowance and Fees Due (PTOL-85)) dated Dec. 23, 2021 for U.S. Appl. No. 16/778,841 (pp. 1-9).
Office Action (Notice of Allowance and Fees Due (PTOL-85)) dated Feb. 8, 2022 for U.S. Appl. No. 16/778,987 (pp. 1-8).
Office Action (Notice of Allowance and Fees Due (PTOL-85)) dated Jan. 13, 2022 for U.S. Appl. No. 16/864,800 (pp. 1-7).
Office Action (Notice of Allowance and Fees Due (PTOL-85)) dated Jan. 14, 2022 for U.S. Appl. No. 16/778,923 (pp. 1-8).
Office Action (Notice of Allowance and Fees Due (PTOL-85)) dated Aug. 11, 2021 for U.S. Appl. No. 16/902,186 (pp. 1-8).
Office Action (Notice of Allowance and Fees Due (PTOL-85)) dated Feb. 2, 2022 for U.S. Appl. No. 16/778,889 (pp. 1-8).
Office Action (Non-Final Rejection) dated Feb. 1, 2022 for U.S. Appl. No. 17/222,763 (pp. 1-9).
Office Action (Notice of Allowance and Fees Due (PTOL-85)) dated Mar. 9, 2022 for U.S. Appl. No. 16/841,957 (pp. 1-9).
Office Action (Final Rejection) dated May 13, 2022 for U.S. Appl. No. 17/222,763 (pp. 1-11).
Office Action (Non-Final Rejection) dated Aug. 30, 2022 for U.S. Appl. No. 17/222,763 (pp. 1-11).
Office Action (Notice of Allowance and Fees Due (PTOL-85)) dated Feb. 22, 2024 for U.S. Appl. No. 17/705,010 (pp. 1-9).
Office Action (Non-Final Rejection) dated Mar. 7, 2024 for U.S. Appl. No. 18/351,965 (pp. 1-38).
Office Action (Non-Final Rejection) dated Mar. 7, 2024 for U.S. Appl. No. 18/351,962 (pp. 1-38).

(56) References Cited

OTHER PUBLICATIONS

Office Action dated Mar. 19, 2024 for U.S. Appl. No. 18/191,693 (pp. 1-17).
Notice of Allowance dated Apr. 16, 2024 for U.S. Appl. No. 17/844,466 (pp. 1-5).
Office Action (Notice of Allowance and Fees Due (PTOL-85)) dated Apr. 16, 2024 for U.S. Appl. No. 17/844,466 (pp. 1-5).
Australian Examination Report No. 1 issued in App. No. AU2023201845, dated Jun. 12, 2024, 4 pages.
Office Action (Non-Final Rejection) dated Jun. 18, 2024 for U.S. Appl. No. 17/857,988 (pp. 1-18).
Office Action (Notice of Allowance and Fees Due (PTOL-85)) dated Jul. 16, 2024 for U.S. Appl. No. 18/351,965 (pp. 1-8).
Office Action (Notice of Allowance and Fees Due (PTOL-85)) dated Jul. 16, 2024 for U.S. Appl. No. 18/351,962 (pp. 1-8).
Office Action (Non-Final Rejection) dated Jul. 29, 2024 for U.S. Appl. No. 17/709,146 (pp. 1-7).

* cited by examiner

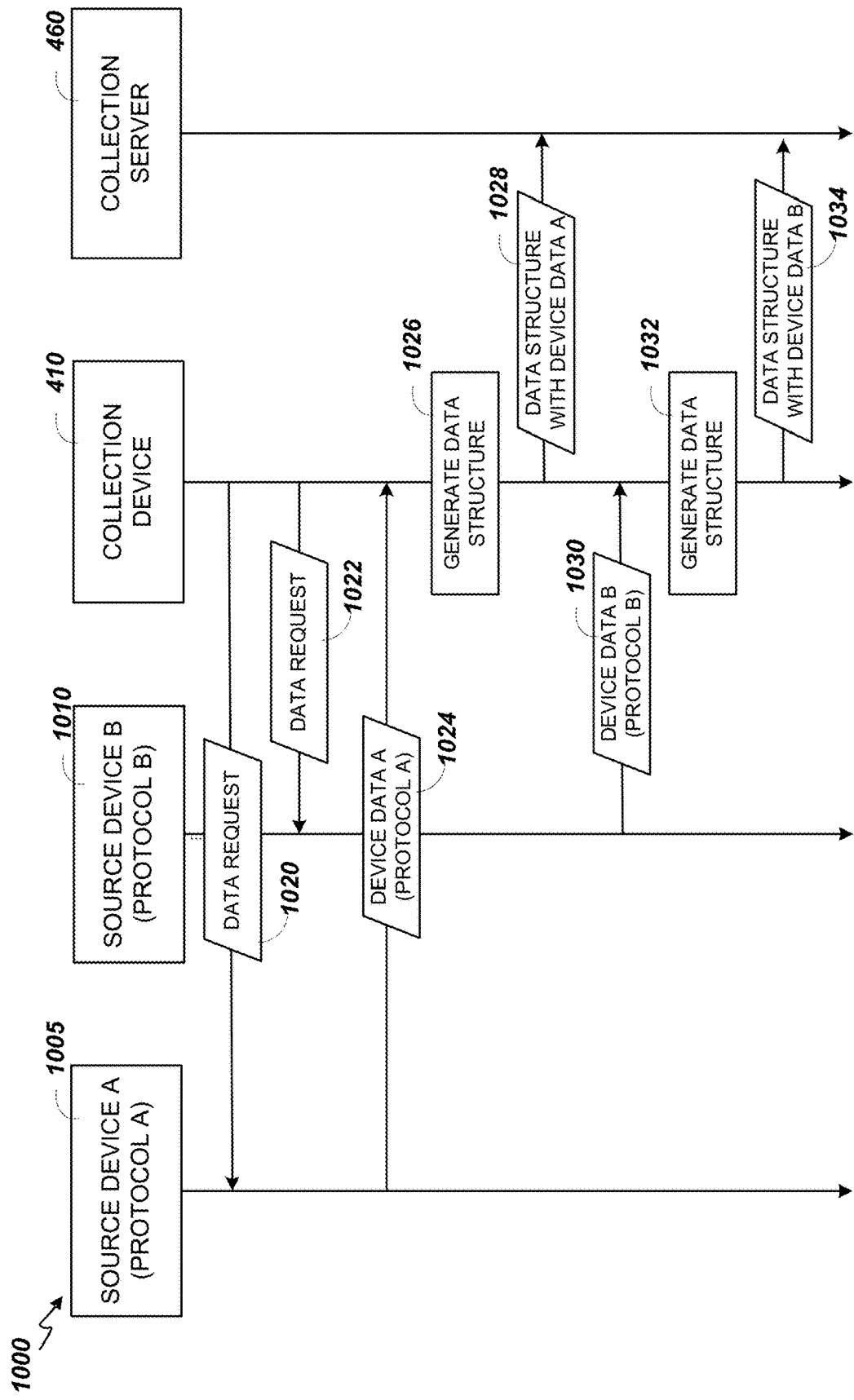

DATA COLLECTION CLOUD SYSTEM FOR ELECTRONIC GAMING MACHINES

TECHNICAL FIELD

The field of disclosure relates generally to electronic gaming, and more particularly to systems and data collection devices for electronic gaming machines (EGMs) including data collected from an EGM indicating that a button on the EGM has failed and requires maintenance.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION OF THE DRAWINGS

FIG. 10 depicts a flow diagram of a technique for using a data collection API for transmitting device data to a collection server, according to some embodiments.

DETAILED DESCRIPTION

Figure 1:
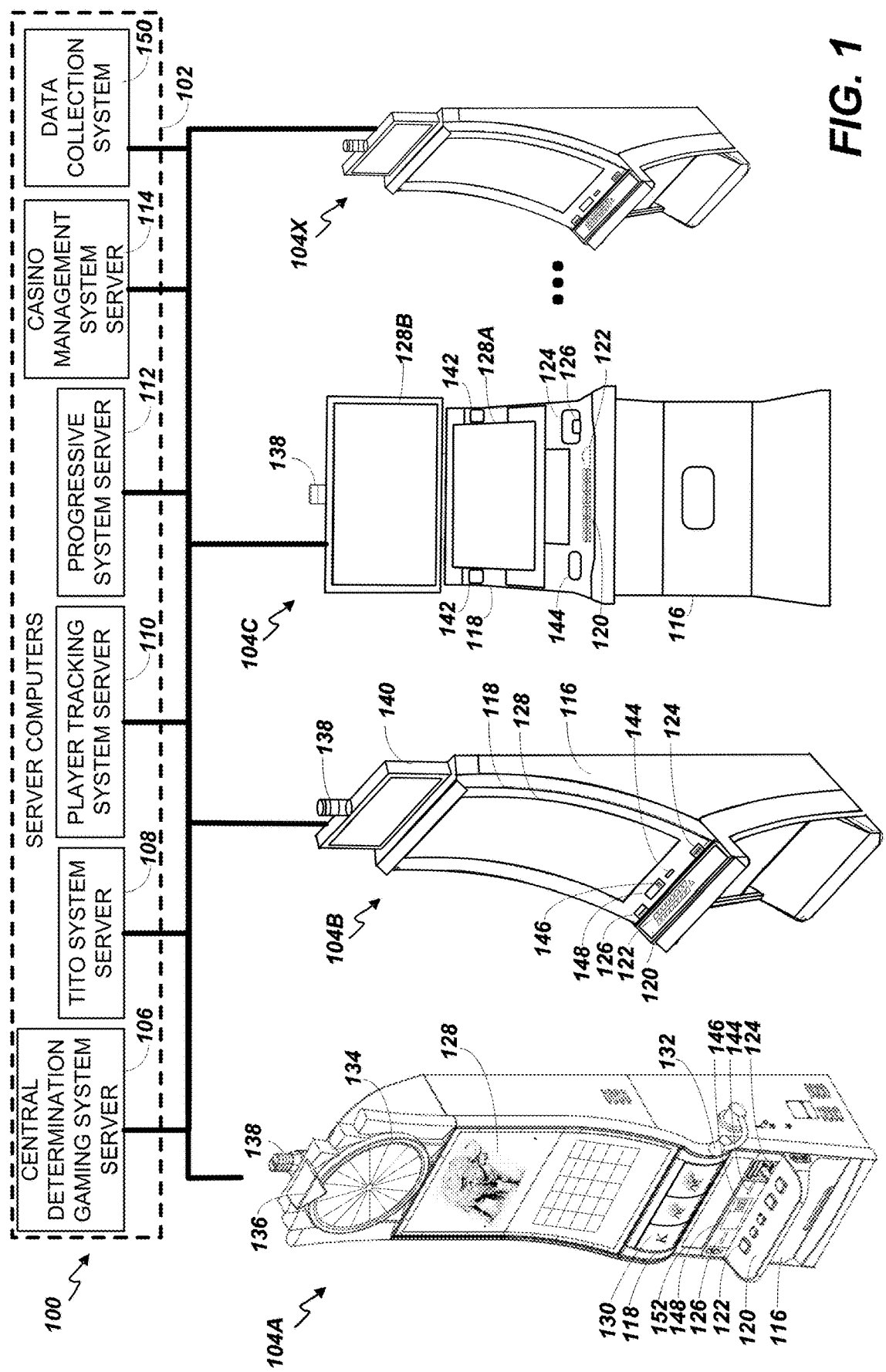
FIG. 1 is an exemplary diagram showing several EGMs networked with various gaming related servers.

Electronic gaming devices, systems and methods are described herein that provide local and remote data collection for electronic gaming machines ("EGMs"). EGMs may be configured to publish game play data and other operational data associated with wagering activities performed on the EGMs via the local private network. One protocol for publishing such data for land based wagering games is Game to System ("G2S"), promulgated by the International Gaming Standards Association ("IGSA"). Such EGM data may be made available to the servers of casino operators on their local networks. However, such data is typically not remotely accessible (e.g., due to security concerns). As such, casino operators may have access to EGM data such as operational data, but manufacturers and other supporting third-party providers may not have such access. This lack of remote visibility to EGM data may cause issues for some third-party providers. For example, during the Covid-19 virus outbreak, some regulatory jurisdictions mandated certain limitations on operations of EGMs, such as only allowing a certain number or a certain percentage of a venue's EGMs to be operational at any time. While operators may have had access to EGM data to track and monitor compliance, third parties associated with those EGMs would need to send field technicians out to the venues to manually inspect the EGMs.

In an example embodiment, a data collection system is provided herein for remote collection of EGM data from casino venues. A collection device is installed locally with a group of EGMs (e.g., a bank of EGMs) and networked via a private wired network upon which the EGMs are configured to transmit EGM data in the G2S protocol. The group of EGMs register with their particular collection device (e.g., as a "G2S host") to provide EGM data via the private G2S network, and the collection device may temporarily store the collected data in a local database. The collection device also includes a wireless network interface that is configured to communicate with a remote cloud (e.g., via persistent or occasional communications link over a wireless 3G/4G/5G cellular network). The collection device authenticates with an identity server provided by the remote cloud and encrypts communications between the collection device and a collection database provided by the remote cloud. As the collection device(s) collect EGM data, they transmit that EGM data to the collection database for further processing (e.g., to improve performance, conduct diagnostics, evaluate operational data, or the like).

Some embodiments described herein provide a technical solution for flexible data collection so that data structures, data modeling logic, and pipeline configurations can evolve over time. In particular, embodiments described herein can be configured to collect data not only web traffic and trends on online gaming sites but also collecting EGM data in a brick-and-mortar casino. In some embodiments, the data collection architecture is not data or protocol specific and, as such, any device or application with access to the cloud could generate data that can be turned in to actionable analytics.

To provide flexibility while maintaining the ability to conduct meaningful analysis with the data that is gathered, embodiments described herein create a flexible data collection system (i.e., cloud system) that strikes a balance between consistency of known data elements and allowing new information to be transmitted and gathered without changes to the existing architecture. Specifically, the flexible data collection system accomplishes this by using a combination of static and dynamic data elements. As an example, to collect G2S data, the static data elements could be a set of key value pairs that must be included in messages sent to the flexible data collection system and conform to a common set of names and data types. For example, each message may have an ID attribute and value that would be unique across the flexible data collection system and could be potentially sortable. For dynamic data element(s), the flexible data collection system could use a "Trait" attribute that could contain any type of data. In an embodiment to collect G2S data, the "Trait" attribute could contain a JSON document that contains all the key value pairs that compose the messages collected. Other embodiments could use other data structures for the Trait attributes. As an example, the Trait attribute could contain a "blob" or string of data with no particular format. The number and names of attributes can vary from device to device and/or from action to action to allow for a wide range of flexibility.

The flexible data collection system may have myriad uses. In one example, one problem that exists in the gaming industry that the disclosed data collection system may address involves a defective mechanical button on an EGM that may go undetected for a period of time causing a casino and the manufacturer of the EGM to lose play on the EGM. Without the data collection system described herein, a casino operator may be able to detect such a defective button if the operator is savvy enough to monitor the "coin in" on a back end system and detecting a discrepancy in normal play of the EGM versus actual play. Using this approach to detect a defective game-play button is not effective and for a variety of reasons the defective button may not be detected in a timely manner. In some cases, the failing button can also be masked if the player is still able to play the EGM by using an alternative button to press (e.g., use a virtual bet button). However, non-operable buttons are frustrating to a player and the alternatives may not be suitable (e.g., the bet button that works is twice their normal bet).

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards. Additionally, or alternatively, one or more of gaming devices 104A-104X may be configured as a tabletop game, as shown below in FIG. 4.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, a casino management system server 114, and/or a data collection system 150. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
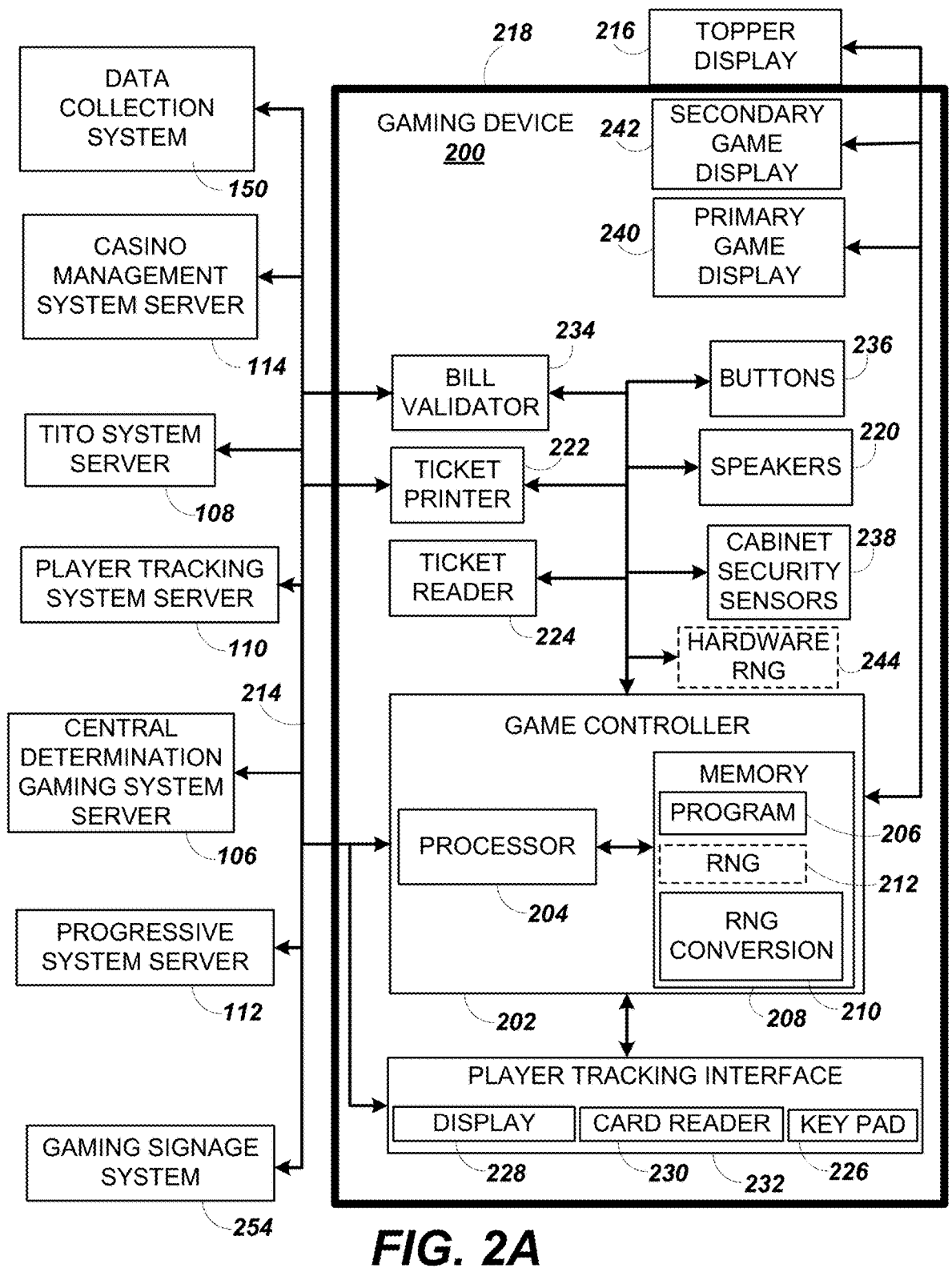
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Figure 4:
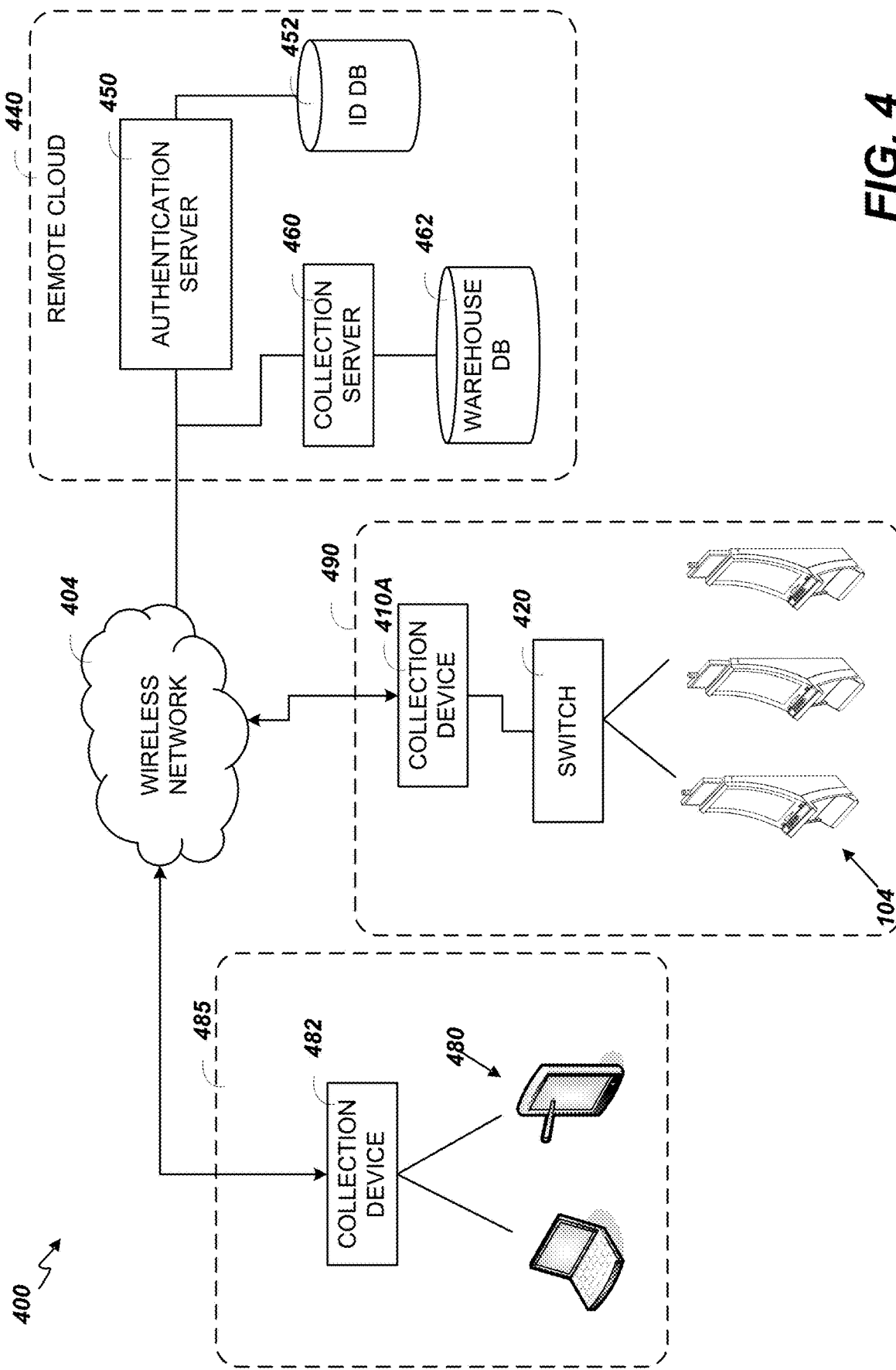
FIG. 4 illustrates a networked architectures for an example data collection system for multiple types of gaming environments.

Although gaming devices 104A-104X are shown in FIG. 1 as upright EGMs, the systems and methods described herein can be used on upright EGMs or table type EGMs as shown in FIG. 4.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

In an example embodiment, a tabletop EGM (not shown in FIG. 1) is provided which may be similar to the gaming devices 104. The tabletop EGM may include a horizontal display device that can be used by patrons as a conventional table surface as well as for providing player input (e.g., touchscreen surface, mechanical buttons, or the like) and display output (e.g., virtual wheel, virtual slot reels) for a tabletop game. The tabletop EGM may support participation for multiple players during game play (e.g., as patrons socially meet around the tabletop EGM). Example tabletop EGMs and features are described in greater detail below.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
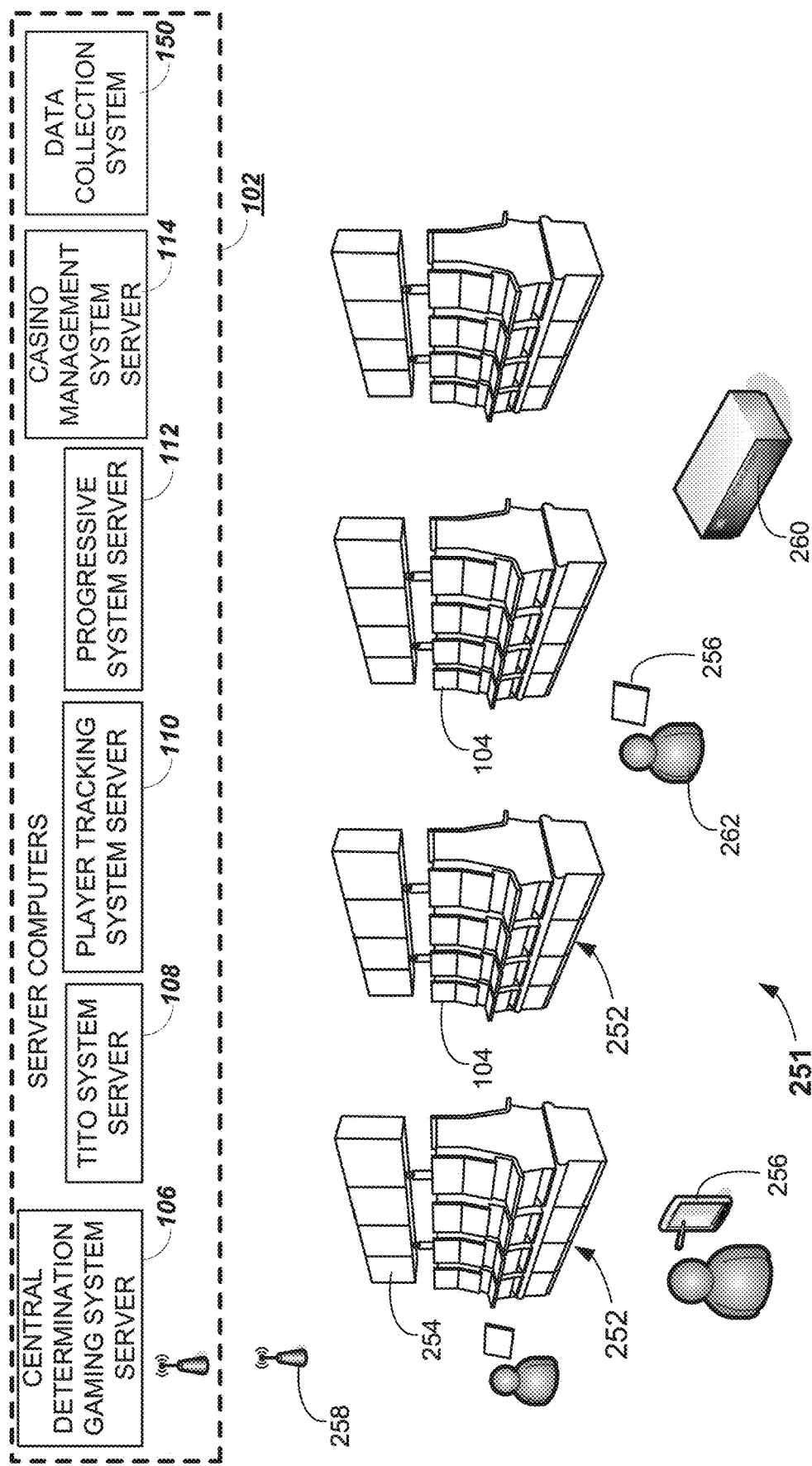
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
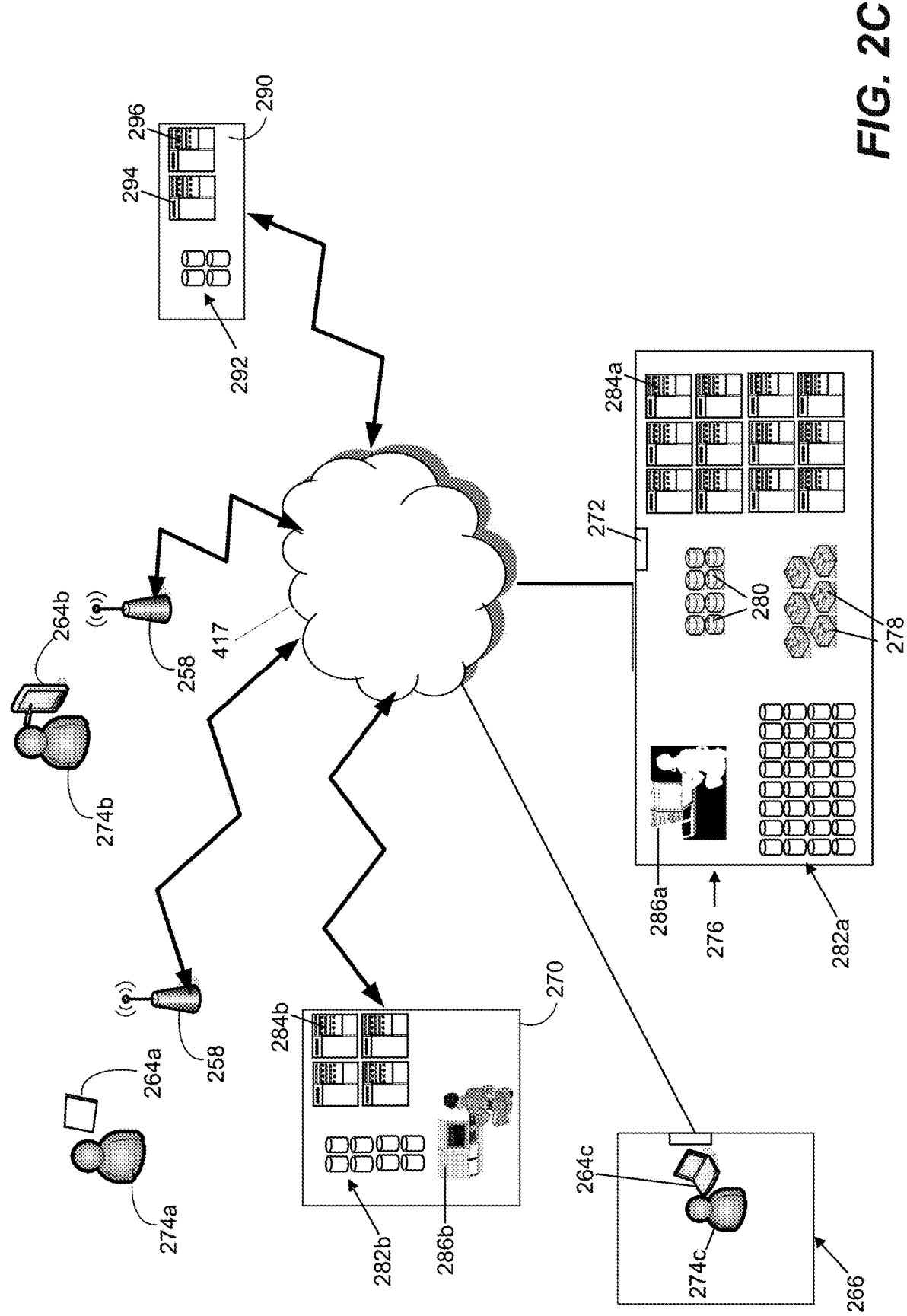
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In some embodiments, a data collection system 290 is also configured for communication via the networks 417. Here, the data collection system 290 includes a collection server 294 and an authentication server 296. According to some embodiments the collection server is configured to store the collected data for later use, such as data analytics and the like. In some embodiments, the collection server 460 may be configured to facilitate storage of collected data in an additional network storage 292. The data collection system 290 also includes an authentication server 296, which provides authentication services for devices collecting data. In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
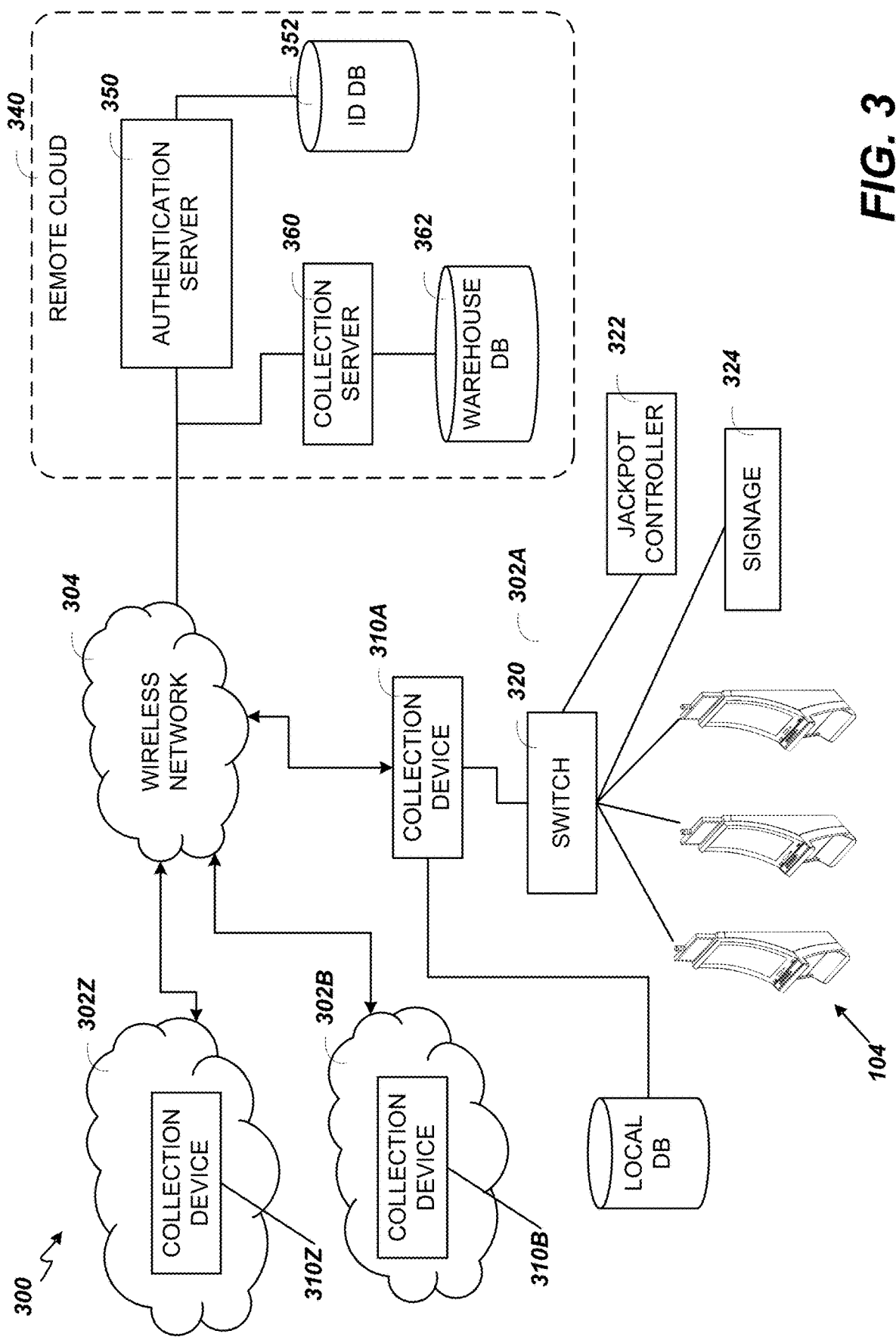
FIG. 3 illustrates, a network architecture for an example data collection system for electronic gaming machines.

FIG. 3 is a networked architecture for an example data collection architecture 300, depicted in this example as being used for electronic gaming machines. In the exemplary embodiment, a data collection system 340 is included in a remote cloud that is in networked communication with multiple groups of connected EGMs 104, shown in FIG. 3 as private EGM networks 302A-302Z (collectively, private EGM networks 302). For purposes of illustration, FIG. 3 is described in reference to one particular EGM network 302A (e.g., jackpot progressive network). Each private EGM network 302 includes a collection device 310 (individually, 302A, 302B, 302Z) that is network connected to a wired network switch 320, which is shared with a particular group of EGMs 104 (e.g., a bank 252 of EGMs 104). In the example embodiment, the private EGM network 302A is a protected network on which the EGMs 104 are configured to publish sensitive operational data in the G2S protocol. Components of the private EGM network 302A may be housed in a secured location, such as a locked component cabinet of a bank 252 of EGMs 104. Logically, the private EGM network 302A may also be secured from other networks, such as public or private local area networks of the casino operators (e.g., network 214). In other embodiments, the private EGM network 302A may be network 214 (e.g., shared with other back-of-house support servers). The private EGM network 302A may also include a jackpot controller 322 that is configured to provide and manage jackpot(s) for the EGMs 104 (e.g., progressive jackpots shared amongst multiple EGMs), and may also include signage 324 such as a bank display screen showing, for example, current jackpot totals, attraction graphics, or the like.

Remote data collection by third parties from such private EGM networks 302 may be inhibited by conventional network architectures. For example, some conventional private EGM networks may be isolated networks (e.g., allowing only a few computing devices to participate in the network) or may be controlled operator networks (e.g., private networks controlled by individual operators and their associated support devices). Accordingly, to provide visibility into operations of the EGMs 104, the collection device 310 collects EGM operational data associated with each of the EGMs 104 in the configured group (e.g., in their particular private EGM network 302). That is, a single collection device 310 can collect data from multiple gaming devices. For example, the collection device 310 may collect game play data, jackpot hit data, reboot data, or the like. EGM operational data can include any data made available by the EGMs 104 via the private EGM network 302 (e.g., via G2S subscription, publication, request, or the like). The collection device 310 may be configured with a particular profile defining what data is to be collected from the various EGMs 104 on their private network 302. For example, the collection device 310 may subscribe to data from a particular machine and/or of a particular data type.

The collection device 310 may store or stage such data in a local database 312 and/or may periodically or persistently connect to a collection server 360 which may be part of a data collection system 340 in a remote cloud, according to some embodiments. In some embodiments, the collection device includes a wireless modem by which the collection device 310 can communicate with devices within the remote cloud. The collection server 360 may store the collected data for later use, such as data analytics and the like. In some embodiments, the collection server(s) 360 provide application programming interface(s) ("APIs") through which the collection devices 310 interact with the collection server(s) 360 (e.g., in a microservices architecture to upload collected data, to request configuration profiles, or the like). As such, the collection server(s) 360 may be configured to receive data from a variety of protocols and environments.

An authentication server 350 may also be provided in the data collection system, for example, in the same remote cloud as the collection server 360. The authentication server 350 provides authentication services for the collection devices 310, which controls communications between the collection devices 310 and the collection server(s) 360 (e.g., providing or restricting permissions for the various collection devices 310 to the services offered by the collection server(s) 360).

The architecture 300 provides numerous technical benefits over existing architectures. For example, the addition of a collection device 310 as a G2S host to a closed network between a group of EGMs 104 allows G2S data to be captured in a manner that does not disrupt existing reporting of gaming revenue nor impact performance of the EGM. Use of the wireless connection for data upload avoids the need to physically network connect the private EGM network 302 to a back-of-house network and also avoids overwhelming local network devices with data transfers by shifting the connectivity and associated traffic to a wireless connection with the wireless network 304. Further, many conventional back-of-house networks capture data from EGMs via the SAS protocol, a protocol that proves a very limited set of EGM operational data. As such, this architecture 300 allows a G2S host to remotely transfer EGM operational data out to a third party (e.g., to the remote cloud) outside of the brick-and-mortar casino via a secured wireless connection. In some embodiments, the collection server 360 may upload the received data to a warehouse database 362.

In some embodiments, the collection system may be configured to receive collection data from multiple types of gaming environments. For example, a collection system can be configured to collect data from computing environments running different protocols, and/or from multiple types of gaming environments, such as casino environments, online gaming at user client devices, and the like. FIG. 4 is a networked architecture for an example data collection architecture 400, depicted in this example as being used for gaming devices, such as electronic gaming machines, end user devices configured to communicate with a gaming network, and the like. In the exemplary embodiment, the data collection architecture 400 includes a data collection system comprised in a remote cloud 440 that is in networked communication with multiple EGMs 104, or multiple groups of connected EGMs 104. That is, a single collection device 410A may be configured to collect data from multiple devices, for example via switch 420. The EGMs 104 may be housed in a casino environment 490, in some embodiments. As described above, the EGMs may be connected across a private EGM network. For example, the collection device 410 may collect game play data, jackpot hit data, reboot data, or the like. EGM operational data can include any data made available by the EGMs 104 via the private EGM network (e.g., via G2S subscription, publication, request, or the like). The collection device 410 may be configured with a particular profile defining what data is to be collected from the various EGMs 104 on their private network. For example, the collection device 410 may subscribe to data from a particular machine and/or of a particular data type.

The collection device 410 may store or stage such data in a local database and/or may periodically or persistently connect to a collection server 460 which may be part of a collection system 440 in a remote cloud, according to some embodiments. In some embodiments, the collection device includes a wireless modem by which the collection device 410 can communicate with devices within the remote cloud. The collection server 460 may store the collected data for later use, such as data analytics and the like. In some embodiments, the collection server(s) 460 provide application programming interface(s) ("APIs") through which the collection devices 410 interact with the collection server(s) 460 (e.g., in a microservices architecture to upload collected data, to request configuration profiles, or the like). As such, the collection server(s) 460 may be configured to receive data from a variety of protocols and environments.

An authentication server 450 may also be provided, for example, in the same remote cloud 440 as the collection server 460. The authentication server 450 provides authentication services for the collection devices 410, which controls communications between the collection devices 410 and the collection server(s) 460 (e.g., providing or restricting permissions for the various collection devices 410 to the services offered by the collection server(s) 460).

The data collection architecture 400 also provides network connectivity between the data collection system in the remote cloud 440 and gaming devices that are in a network environment 485, such as EUDs 480 configured to execute gaming applications, and/or EGMs in a separate casino environment than casino environment 490. In the example of FIG. 4, collection device 482 may collect gaming data from EUDs 480, such as user information, gaming statistics, gaming operability, and the like. Notably, in some embodiments, a single collection device 482 may be configured to collect data from multiple EUDs 480. The collection device 482 may store or stage such data in a local database and/or may periodically or persistently connect to a collection server 460 which may be part of a collection system 440 in a remote cloud, according to some embodiments. In some embodiments, the collection device includes a wireless modem by which the collection device 482 can communicate with devices within the remote cloud. The collection server 460 may store the collected data for later use, such as data analytics and the like. In some embodiments, the collection server(s) 460 provide application programming interface(s) ("APIs") through which the collection devices 482 interact with the collection server(s) 460 (e.g., in a microservices architecture to upload collected data, to request configuration profiles, or the like).

The data collection architecture 400 provides numerous technical benefits over existing architectures. For example, the addition of a collection device 410 as a G2S host to a closed network between a group of EGMs 104 allows G2S data to be captured in a manner that does not disrupt existing reporting of gaming revenue nor impact performance of the EGM. Use of the wireless connection for data upload avoids the need to physically network connect the private EGM network to a back-of-house network and also avoids overwhelming local network devices with data transfers by shifting the connectivity and associated traffic to a wireless connection with the wireless network 404. Further, many conventional back-of-house networks capture data from EGMs via the SAS protocol, a protocol that proves a very limited set of EGM operational data. As such, this system 400 allows a G2S host to remotely transfer EGM operational data out to a third party (e.g., to the remote cloud 440) outside of the brick and mortar casino via a secured wireless connection. In some embodiments, the collection server 460 may upload the received data to a warehouse database 462. Moreover, the network architecture 400 allows the data collection system to collect data from multiple computing environments, and/or from multiple gaming device types, and aggregate the data into a common collection server 460 and/or warehouse database 462 for later analysis.

Figure 5:
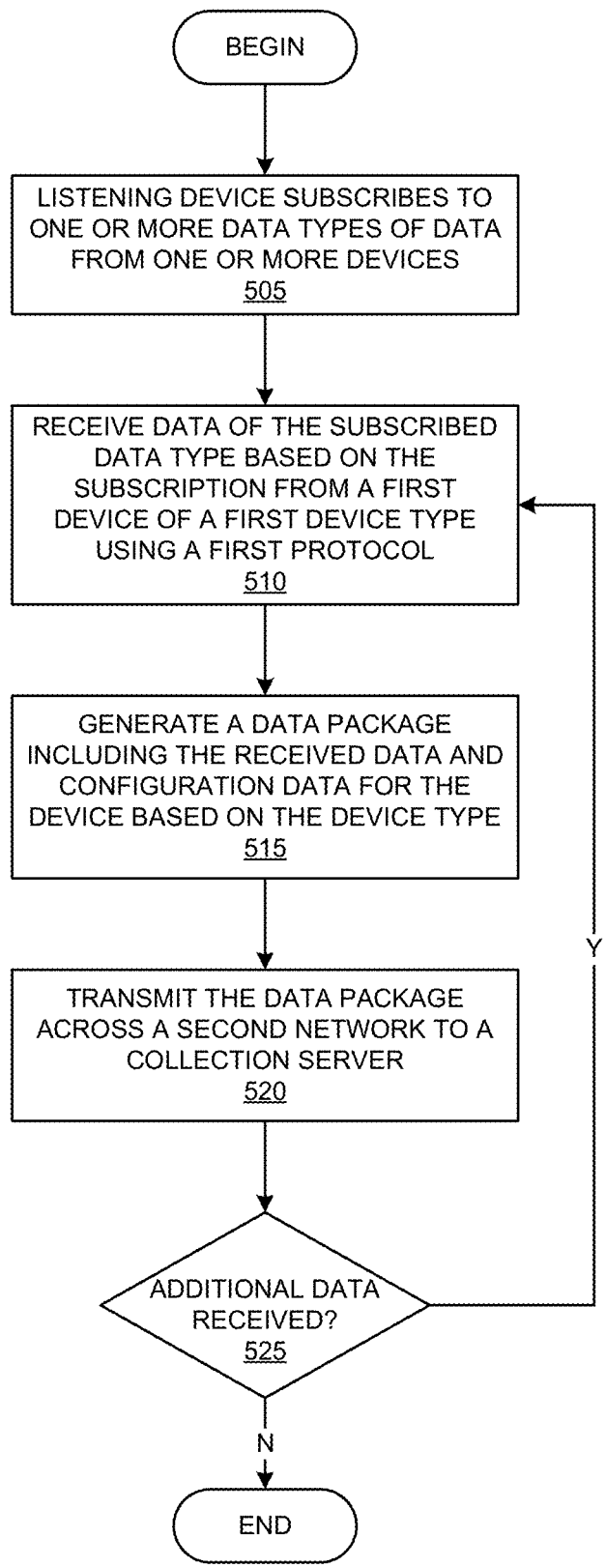
FIG. 5 is a flowchart of a technique for a data collection system collecting data, according to some embodiments.

FIG. 5 is a flowchart of a technique for a data collection system collecting data, according to some embodiments. For purposes of clarity, the flowchart will be described with respect to the components of FIG. 4. However, it should be understood that alternative components may be used. Further, the various processes of the flowchart may be performed in an alternative order. In some embodiments, not all processes may be performed, or some may be performed in parallel.

The flowchart 500 begins at block 505 where the listening device (e.g., the collection device) subscribes to one or more data types of data from one or more devices. In some embodiments, the collection device may be configured to request or otherwise receive data of a particular type from one or more devices. The devices may be gaming related devices, such as EGM 104, or other devices accessible to the listening device across a network, such as other network devices or electronic devices producing data and communicably connected to the collection device One example operational use case for the data collected on the remote cloud includes analyzing operational state and time of a particular EGM 104. For example, presume the subject EGM 104 is a reoccurring revenue device in which a manufacturer is compensated by an operator based at least in part on how often the EGM 104 is installed and operational at a venue of the operator (e.g., available to be played by patrons). Accordingly, the manufacturer may be interested in tracking the operational time of that EGM 104. As such, the data collection system 400 may configure the appropriate collection device 410 to periodically collect operational status information for that EGM 104 and subsequently may evaluate such collected data (e.g., with an analytics server, not shown, at the remote cloud 440) to determine when, how often, or during what timeframes, that EGM 104 was operational. Thus, the data type may include operational status information, in this example. As an example, a user may be using an app on a personal mobile device communicably connected to the collection device 410. For example, the collection device 410 may be associated with the app in some manner, such as common ownership or the like. As such, the collection device 410 may subscribe to particular information from the app on the personal mobile device.

In some embodiments, when a collection device 410 first boots up, the collection device 410 may a configuration service in the cloud 440 (e.g., hosted by the collection server 460 or another supporting device in the cloud 440) to determine whether to download and update a configuration profile for the collection device 410. The configuration profile may define what data the collection device 410 collects for each device to which it is connected. In some embodiments, the cloud 440 may store profiles specific for particular collection devices 410 or profiles for particular types of sending device and the collection device 410 may compare a current profile on the collection device 410 to the cloud profile (e.g., via hash comparison) to determine whether or not to update the profile on the collection device 410. If an update is determined, the collection device 410 may request a new profile from the cloud 440 and may install and update the profile on the collection device 410.

The flowchart 500 continues at block 510 where data of the subscribed data type is received based on the subscription from a first device using a first protocol. In some embodiments, the listening device may receive the data in responding to transmitting a request to the device. Alternatively, the data may be received based on an ongoing subscription to the type of data. According to some embodiments, the listening device may be able to handle data received in various formats. For example, the listening device may communicably connect to multiple devices in multiple environments using different data protocols. The listening device may be configured to receive data in each of these protocols.

The flowchart continues at block 515 where the listening device generates a data package including the received data and configuration data for the device. For example, the configuration may include data regarding the sending device, the data being collected and transmitted, and the like. In some embodiments, other identifying information may be provided, such as identifying data for the collection device, time stamp information, and the like. Further, in some embodiments, the configuration information may include state information of the sending device at the time the data was generated and/or transmitted to the listening device. In some embodiments, the data package may include a predetermined data structure having a static portion and a dynamic portion, where the configuration information is provided in the static portion and the received data is provided in the dynamic portion. At block 520, the data package is transmitted across a second network to a collection server. According to some embodiments, the collection server contains the data in the data structure in an aggregated form. The data package may be transmitted automatically, in response to the data package being generated, or may be stored locally for later transmission. As an example, if a collection server is unavailable, the data package may be store locally until it can be transmitted to the collection server. In some embodiments, the collection server may process the data structure to enhance aggregation and analysis, for example by making the data more searchable. The data is stored in a data lake that is available for future use, such as data analysis.

At block 525, a determination is made with respect to whether the listening device receives any additional data. If additional data is received, then the flowchart returns to block 510 and the listening data continues to process received data and transmitting the data to the collection server for storage. If, at block 525, no further data is received at the listening device, then the flowchart ceases.

Figure 6:
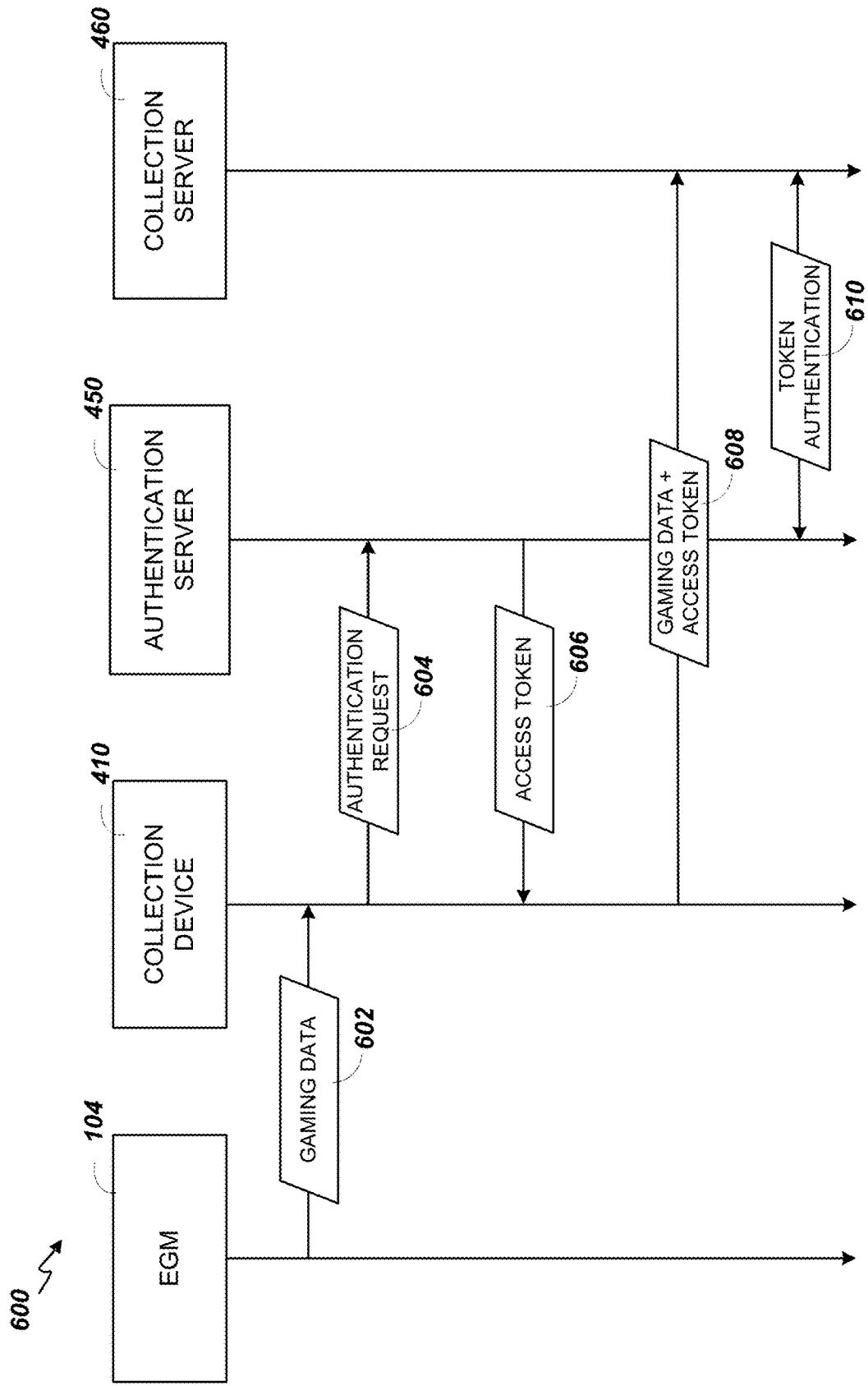
FIG. 6 is a flow diagram of a technique for securely transmitting gaming data to a collection server, according to some embodiments.

FIG. 6 is a flow diagram of a technique for securely transmitting data to a collection server, according to some embodiments. For purposes of the example of FIG. 6, gaming data is transmitted from an EGM to a collection server. However, in some embodiments, alternative data may be transmitted, and/or an alternative sending device may be used.

FIG. 6 shows a flow diagram 600 in which data flows among various components in a network architecture, including an EGM 104, a collection device 410, an authentication server 450, and a collection server 460. As described above, in some embodiments, the collection device 410 can be subscribed to received particular data from a sending device, such as EGM 104. In the example provided, collection device 410 receives gaming data 602 from the EGM.

According to one or more embodiments, the collection device 410 needs to be authenticated in order to transmit the received gaming data 602 to the collection server 460. For example, when a particular collection device 410 seeks to establish connection to the collection server 460, the collection device 410 first authenticates their identity with the authentication server 450. As such, the collection device 410 transmits an authentication request 604 to the authentication server 450. In one embodiment, the authentication server 450 runs IdentityServer (e.g., IdentityServer4), an OpenID Connect and OAuth framework for ASP.NET Core, which provides authentication as a service, issuing access tokens for API functionality between collection devices 410 and the collection server(s) 460, and their associated microservices. Each collection device 410 may be tracked and permissioned for various service access in an identity database 452.

Once authenticated, the authentication server 450 provides an access token 606 to the collection device 410 for the particular server(s)/service(s) requested, such as the collection server 460. Then, the collection device 410 can transmit an upload request 608 including the access token and the gaming data. Upon receipt of the upload request 608, the collection server 460 performs token authentication 610 with the authentication server 450 (e.g., to ensure the operation is permissioned for this particular collection device 410) before uploading the gaming data into the collection server or other repository, such as warehouse database 462.

The various communications between the collection device(s) 410 and the remote cloud devices, such as authentication server 450 and collection server 460 may be encrypted over the wireless network 404 (e.g., cellular network, including possibly the Internet) via Transport Layer Security ("TLS") protocol. In one example network architecture, the remote cloud 440 may be networked over network 404 with the collection devices 410 via Border Gateway Protocol ("BGP") using autonomous system numbers ("ASNs") over an Internet Protocol Security ("IPSEC") network. The data collection system may use a certificate authority and may perform mutual transport layer security, where both sides (e.g., the remote cloud 440 device(s) and the collection device(s) 410) have digital certificates for communications encryption.

Figure 7:
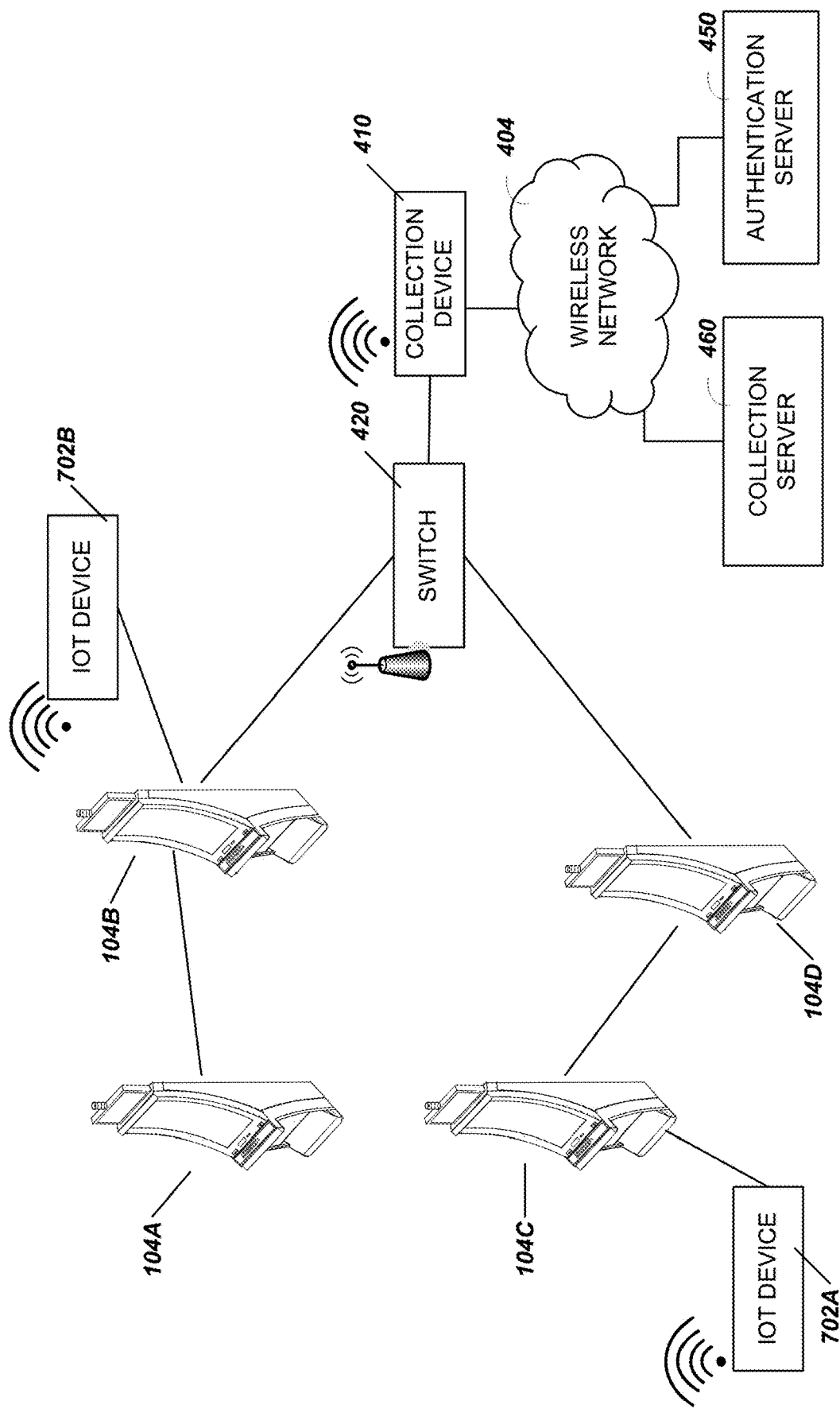
FIG. 7 is a network diagram of a mesh topology in a gaming environment, according to one or more embodiments.

According to some embodiments, the data collection system provides a flexible data collection solution such that data structures, data modeling logic, and pipeline configurations can evolve as business needs progress. FIG. 7 is a network diagram of a mesh topology in a gaming environment, according to one or more embodiments. In particular, FIG. 7 shows a network diagram of a set of EGMs 104 communicably connected to a switch 420 in a mesh topology. According to one or more embodiments, in a mesh topology, data transmission between any two devices may be shared with additional devices, or all devices connected across the mesh. That is, as shown, EGM 104A and EGM 104B are connected to switch 420 in a manner such that data from EGM 104A is transmitted to the switch 420 via a connection through 104B. Similarly, EGM 104C and EGM 104D are connected to switch 420 in a manner such that data from EGM 104C is transmitted to the switch 420 via a connection through 104D. Accordingly, the collection device 410 may collect data from multiple EGMs in an environment.

Additionally, or alternatively, in some embodiments, the collection device may utilize a wireless connection to connect to multiple EGMs. As an example, each of the EGMs 104 may be Wi-Fi enabled and may transmit data to the switch 420 wirelessly, from which the collection device 410 can collect data from the multiple machines.

In some embodiments, the collection device 410 may receive data from one or more SAS collectors in the network structure. The SAS collector may be a device that taps, monitors, and/or intercepts the SAS data bus from an EGM. In some embodiments, a 1:1 ratio may exist between a SAS collector and an EGM. Thus, in the topology shown in network diagram 700, the collection device 410 may receive data from multiple SAS collectors. Further, in some embodiments, one or more of the EGMs may be communicably connected to an EGM. For example, as depicted in the network diagram, EGM 104C is communicably connected to IoT device 702A, and EGM 104B is communicably connected to IoT device 702B. In some embodiments, the IoT devices could collect environmental data related to the EGMs using sensors. For example, the IoT devices 702 may collect data regarding meat, moisture, air pressure, vibration, power, and/or GPS location. Additionally, or alternatively, the IoT could intercept data on a SAS data bus on the EGM, and transmit the data to the collection device 410, for example over a wireless network.

Figure 8:
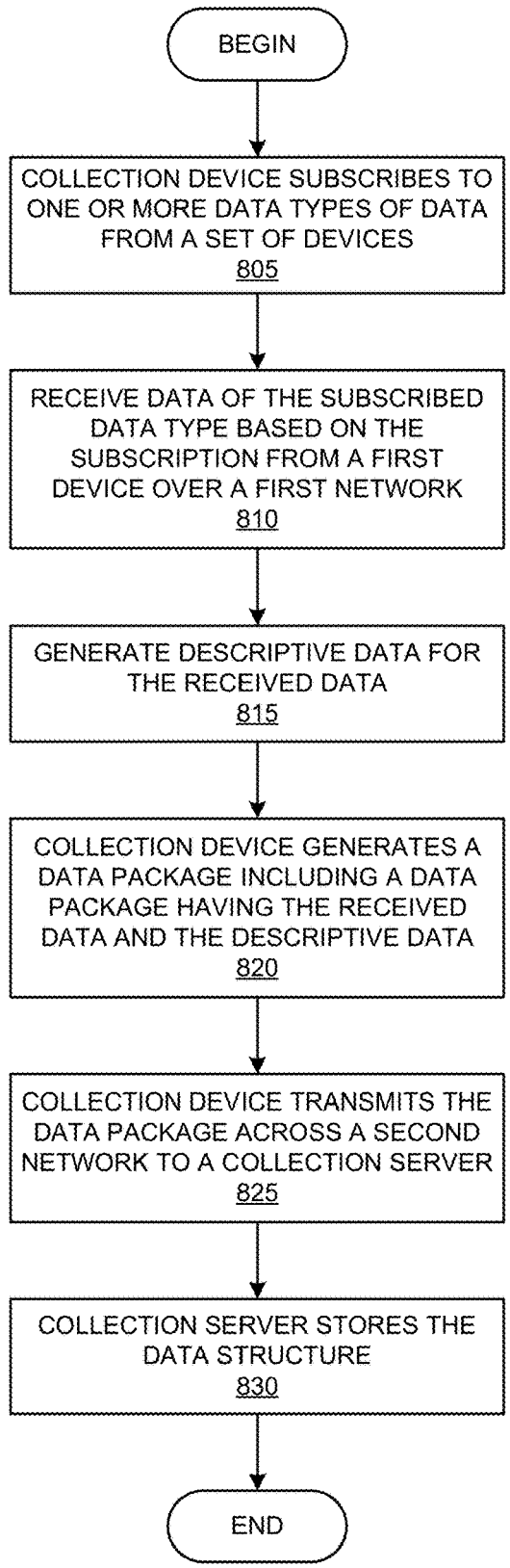
FIG. 8 is a flowchart of a technique for utilizing a data structure to transmit device data to a collection server, according to some embodiments.

FIG. 8 is a flowchart of a technique for utilizing a data structure to transmit device data to a collection server, according to some embodiments. For purposes of clarity, the flowchart will be described with respect to the components of FIG. 7. However, it should be understood that alternative components may be used. Further, the various processes of the flowchart may be performed in an alternative order. In some embodiments, not all processes may be performed, or some may be performed in parallel.

The flowchart 800 begins at block 805 where the listening device (e.g., the collection device 410) subscribes to one or more data types of data from a set of devices. As shown in FIG. 7, the collection device 410 may receive data from multiple EGMs, for example from a mesh topology over the switch 420, or over a wireless connection. The devices may be gaming related devices, such as EGM 104, or other devices accessible to the collection device 410 across a network, such as other network devices or electronic devices producing data and communicably connected to the collection device.

The flowchart 800 continues at block 810 where data of the subscribed data type is received based on the subscription from a first device using a first protocol. According to some embodiments, the listening device may be able to handle data received in various formats. For example, as described above, the collection device 410 may receive data from an EGM 104 that comports with a Serial Attached SCSI (SAS) protocol, such as data from the SAS bus.

At block 815, the listening device (e.g., the collection device 410) generates descriptive data for the received data. The descriptive data may provide a unique identifier for the data, related to the sending device and/or the content of the data. In some embodiments, the descriptive data may include, at least a message identifier, a transmitter identifier, and a counter value. Other data may be used including a timestamp, an action type, a tracker identifier, and the like.

The flowchart 800 continues at block 825 where the collection device transmits the data package across a network to a collection server. In some embodiments, the collection device is authenticated via an authentication server 450 to obtain a security token. Then, the collection device 410 transmits the data packet to the collection server 460. In some embodiments, the collection device 410 generates the data packet in the form of a predetermined data structure that comports with an API hosted by the collection server 460. In some embodiments, the data structure includes a static portion and a dynamic portion, where the static portion includes identifying information for the sending device and/or content of the data, and the dynamic portion includes the data to be transmitted for storage by the collection server 460. According to one or more embodiments, the network over which the data package is transmitted differs from the network over which the data was received by the switch and/or collection device, such as the wired or wireless network.

The flowchart 800 concludes at block 830 where the collection server 460 stores the data structure for aggregation. In some embodiments, the collection server may process the data structure to enhance aggregation and analysis, for example by making the data more searchable. The data is stored in a data lake that is available for future use, such as data analysis.

Figure 9:
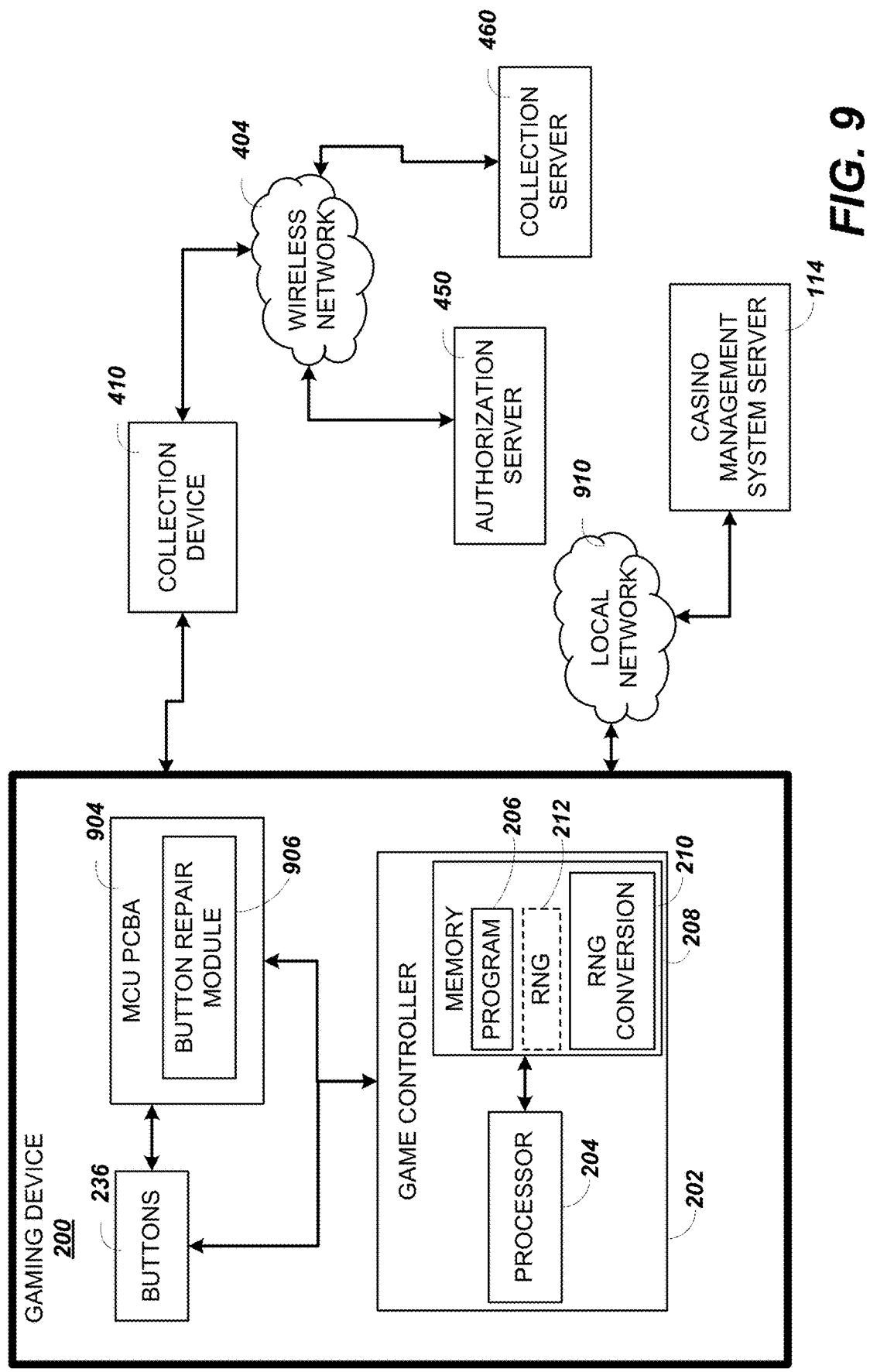
FIG. 9 depicts, in block diagram form, a system diagram for collecting data according to some embodiments.

FIG. 9 depicts, in block diagram form, a system diagram for collecting data according to some embodiments. In particular, FIG. 9 depicts an example system setup in which an IoT device can operatively connect to the collection device 410 to provide device data. Although for purposes of the example, a gaming device 200 is presented, it should be understood that the example is intended for descriptive purposes and alternative devices and/or data may be used.

The system setup 900 includes a game controller 202 and a button 236. As described above, the button 236 may be a mechanical or optical button which, when pressed, triggers the game controller 202 to perform an action. For example, a button press may cause the game controller 202 to trigger a reel spin. The game controller 202 controls games being played on the gaming device 200. The game controller 202 includes a processor 204 and a memory 208. The memory includes computer executable instructions for performing functions, such as game program 206. In addition, the game controller memory 208 may include an RNG 212 that utilizes hardware and/or software to generate RNG outcomes that lack any pattern. Further, the game controller memory 208 may include an RNG conversion engine 210 that translates the RNG outcome from RNG 212 to a game outcome presented to a player.

The gaming device 200 may also include a micro controller unit (MCU) PCBA 904. The MCU PCBA 904 may be configured to receive a signal when the button 236 is pressed under normal working conditions, for example when triggering the game controller to perform an action. For example, the button may be a mechanical button with a switch underneath which, when pressed, closes a loop and triggers the signal. Alternatively, if the button is dynamic, then the button may have optical sensors in the button mechanism that trigger the signal when the button is pressed. Alternative components may be utilized to trigger a signal to be transmitted to the MCU PCBA 904 when the button is pressed.

According to some embodiments, the MCU PCBA 904 may be configured to receive an indication when the button is pressed via additional signals. For example, in some embodiments, pressure sensors or piezo wire sensors may be included in the button mechanism. The MCU PCBA 904 may be able to determine whether a signal indicating the button press based on the pressure sensors or piezo wire sensors coincides with a signal indicating a button press under normal working conditions. For example, the MCU PCBA 904 may include logic to determine whether a pressure-based sensor coincide with a signal indicating normal working conditions of the button.

According to some embodiments, the MCU PCBA 904 is further configured to, in response to determining that a button has malfunctioned, transmit a signal to the game controller to trigger the spin, or otherwise activate the action typically performed in response to a button press. In this case, the repair or self-healing aspect of the button mechanism is never even realized by the player because the game still functions. In other words, the player does not realize that the button is broken, and the game is fully operational when the button is pressed.

In accordance with some embodiments, the MCU PCBA 904 is an IoT device which is communicably connected to a collection device 410. According to some embodiments, the collection device 410 may collect device data from the MCU PCBA 904, for example data related to the signals received related to button presses. That button data may be packaged by the collection device 410 into a data structure which can be aggregated at the collection server 460, and transmits the data to the collection server 460 over a wireless network 404. According to some embodiments, the collection device 410 may be authenticated by the authentication server 450 over the wireless network 404 prior to transmitting the data to the collection server 460.

According to some embodiments, the gaming device 200 connects to a casino management system server 114 over a local network 910. Thus, in some embodiments, the wireless network 404 utilized to transmit data to the collection server 460 is separate and distinct from the local network 910.

According to some embodiments, the MCU PCBA 904 is configured to monitor for button presses and EGM machine activity, wherein "normal" activity shall be determined and set in the processing device of the IoT device as a comparative set of data (e.g., normal being based on historical game play data), and wherein "normal" may be a certain amount of button presses in an hour or a day combined with activity seen on the slot machine (e.g., coin in, coin out, etc.).

When the MCU PCBA 904 device detects a difference in the button activity and the normal game play behavior model (e.g., no button presses versus an expected X amount of presses or COIN IN activity versus no button presses for a period of time), the IoT device will send a notification to an attendant/maintenance personnel to check the button deck for proper operation, and/or the IoT device will send game play data to the collection device 410, which transmits over a wireless network 404 to a remote cloud collection server 460 that will detect the anomalous activity and notify the appropriate personnel. In some cases, the MCU PCBA 904 device and the modeling data will be able to identify the specific button on the EGM that is malfunctioning. Over time, the maintenance application can learn and build better metrics for detection. Preventive maintenance can then be built into the system (e.g., the button has received X number of presses and the data suggests Y % of buttons fail past this data point).

According to some embodiments, the collection server provides an API for allowing flexible data collection such that the collection server is protocol agnostic. FIG. 10 depicts a flow diagram of a technique for using a data collection API for transmitting device data to a collection server, according to some embodiments.

FIG. 10 shows a flow diagram 1000 in which data flows among various components in a network architecture, including a source device A 1005, a source device B 1010, a collection device 410, and a collection server 460. As described above, in some embodiments, the collection device 410 can be subscribed to received particular data from a sending device, such as source device A 1005, and source device B 1010. In the example provided, the source devices may be associated with different protocols. Example protocols include SAS protocol, G2S protocol, X series protocol, and the like.

As described above, initially the collection device 410 subscribes to a particular data type from one or more source devices. In some embodiments, the collection device 410 may interrogate the source devices for the data. As such, at first data request 1020 is transmitted from the collection device 410 to source device A 1005, and data request 1022 is transmitted from the collection device 410 to source device B 1010.

When source device A 1005 generates a data type matching the subscribed data type, then the source device A 1005 will transmit device data A 1024 to the collection device 410. Notably, for purpose of this example, the device data A 1024 is transmitted using a first protocol (shown as Protocol A). The collection device 410 receives the device data and at 1026 generates a data structure. According to one or more embodiments, in order to use the API hosted by the collection server 460, the device data is packaged in a predetermined data structure. The data structure includes a static portion and a dynamic portion. The static portion includes static elements that provide a unique identifier for the data. The dynamic portion includes dynamic data elements and is flexible enough to contain any kinds of data. As such, the API may be configured to read data from multiple types of protocols, and translate the data into a universal data stream that is compatible and/or flexible enough to be usable in multiple environments. By utilizing the data structure with the static and dynamic portions as described, the data collection system provides a flexible solution for data collection from multiple differing environments.

According to one or more embodiments, the static portion includes at least three static elements for receiving and storing data. The three static elements include an identifier for each message, a transmitter identifier, and a counter. The identifier for the message may be a binary string that combines several elements to guarantee uniqueness. The transmitter identifier may correspond to the collector device which has staged the data prior to transmitting the data to the collection server. The counter may be an internal incrementing number to help resolve the order of the received messages. Examples of additional static elements that may be included in the static portion include a tracker identifier, indicating the source of the information, an action element describing the event that is being tracked, a time stamp indicating a date and time the event occurred. In some embodiments, the dynamic portion may include a Traits attribute, which is flexible to handle any kind of data and is used to store the data that is the subject of the message.

The collection device 410 transmits the data structure 1028 to the collection server 460. The collection server 460 can then store the device data in the data structure format in which it received, or upon processing the data for storage, for example by flattening the data When source device B 1010 generates a data type matching the subscribed data type, then the source device B 1010 will transmit device data B 1030 to the collection device 410. Notably, for purpose of this example, the device data B 1030 is transmitted using a second protocol (shown as Protocol B), which is different than the first protocol (Protocol A). The collection device 410 receives the device data and at 1032 generates a data structure. As such, the collection device 410 is configured to generate a data structure in accordance with the API regardless of the protocol by which the data is received. Collection device 410 then transmits the data structure with device data B 1034 to the collection sever 460 for storage. As such, device data A 1024 and device data B 1030 can be aggregated by the collection server 460 for future analytics or other uses.

As described above, the "Traits" element is used to store structured or unstructured information representing the EGM operational data that is the subject of a particular message. The Traits attribute is a parent attribute that stores particular information for various types of data. In some embodiments, the Traits attribute may be provided in a JavaScript Object Notation ("JSON") format that includes key/value pairs of EGM operational data.

An identify message is used to signal that an item that generates data is about to start sending information. It also contains some identifying information about the device. The following is an example of an identify message (truncated for brevity):

```
{
  "_id": {
    "$binary": "AAAAAAAAAAAAoIvTlwAAiA==",
    "$type": "3"
  },
  "TrackerId": "ATI_RLT_93",
  "Action": "Identify",
  "Traits": {
    "Meters": [
      {
        "Type": "Device",
        "Name": "G2S_gamesSinceInitCnt",
        "Value": 0,
        "DeviceClass": "G2S_cabinet",
        "DeviceId": 0
      },
      {
        "Type": "Device",
        "Name": "G2S_significantWinAmt",
        "Value": 0,
        "DeviceClass": "G2S_cabinet",
        "DeviceId": 0
      },
      {
        "Type": "Device",
        "Name": "G2S_playerCashableAmt",
        "Value": 0,
        "DeviceClass": "G2S_cabinet",
        "DeviceId": 0
      },
      {
        "Type": "Device",
        "Name": "G2S_cardedPlayedCnt",
        "Value": 0,
        "DeviceClass": "G2S_cabinet",
        "DeviceId": 0
      },
      ...
    ]
  },
  "TransmitterId": "1614880872174",
  "Timestamp": { "$date": "1970-01-01T00:00:00.000Z" },
  "Counter": { "$numberLong": "136" }
}
```

Profile messages contain information about relevant meters, status information, and configuration for the EGM relating to a specific device. The following is an example of a cabinet profile (truncated for brevity):

```
{
  "_id": {
    "$binary": "AAAAAAAAAAAABHQNdSgAAvg==",
    "$type": "3"
  },
  "TrackerId": "ATI_RLT_69",
  "Action": "CabinetProfile",
  "Traits": {
    "EgmState": "G2S_enabled",
    "MaxCreditMeter": 999900000,
    "DeviceId": 526059076,
    "EgmPosition": "N/A",
    "Meters": [
      {
        "Type": "Device",
        "Name": "G2S_gamesSinceInitCnt",
        "Value": 0,
        "DeviceClass": "G2S_cabinet",
        "DeviceId": 526059076
      },
      {
        "Type": "Device",
        "Name": "G2S_significantWinAmt",
        "Value": 0,
        "DeviceClass": "G2S_cabinet",
        "DeviceId": 526059076
      },
      {
        "Type": "Device",
        "Name": "G2S_playerCashableAmt"
        "Value": 0,
        "DeviceClass": "G2S_cabinet",
        "DeviceId": 526059076
      },
      ...
    ],
    "DeviceClass": "G2S_cabinet",
    "AreaId": "N/A",
    "MachineLocation": "N/A",
    "CabinetStyle": "G2S_upRight",
    "DenomId": 1000,
    "MachineNumber": 0,
    "BankId": "N/A",
    "Status": {
      "Type": "G2S_cabinet",
      "EnableGamePlay": true,
      "EnableMoneyIn": true,
      "HostLocked": false,
      "EgmState": "G2S_enabled",
      "DeviceClass": "G2S_gamePlay",
      "DeviceId": 1,
      "GamePlayId": 0,
      "ThemeId": "G2S_none",
      "PaytableId": "G2S_none",
      "DenomId": 0,
      "MaxWagerCredits": 1,
      "ServiceLampOn": false,
      "LogicDoorOpen": false,
      "LogicDoorDateTime": null,
      "AuxDoorOpen": false,
      "AuxDoorDateTime": null,
      "CabinetDoorOpen": false,
      "CabinetDoorDateTime": null,
      "HardMetersDisconnected": false,
      "GeneralFault": false,
      "ReelTilt": false,
      "ReelsTilted": "",
      "VideoDisplayFault": false,
      "StorageFault": false,
      "GeneralMemoryFault": false,
      "EgmIdle": true,
      "LocaleId": "en_US",
      "TimeZoneOffset": "-00:00",
      "ConfigurationId": 0,
      "EgmEnabled": true,
```

-continued

```
        "HostEnabled": true
    },
    "MachineId": "N/A",
    "LocaleId": "en_US",
    "CurrencyId": "USD",
    "ZoneId": "N/A"
},
"TransmitterId": "1614880876182",
"Timestamp": { "$date": "1970-01-01T00:00:00.000Z" },
"Counter": { "$numberLong": "190" }
}
```

Event messages can contain status information, meter and wager information, as well as transaction log data. The following is an example of a PrimaryGameStarted event:

```
{
    "_id": {
        "$binary": "dwEAANTVhrhFlrdHiQABGg==",
        "$type": "3"
    },
    "TrackerId": "ATI_RLT_4",
    "Action": "PrimaryGameStarted",
    "Traits": {
        "Meters": [
            {
                "Type": "Device",
                "Name": "G2S_wageredAmt",
                "Value": 60000,
                "DeviceClass": "G2S_gamePlay",
                "DeviceId": 0
            },
            {
                "Type": "Wager",
                "WagerCategory": "RBG_WagerCat1",
                "Name": "G2S_wageredAmt",
                "Value": 60000,
                "DeviceClass": "G2S_gamePlay",
                "DeviceId": 2
            },
            {
                "Type": "Wager",
                "WagerCategory": "RBG_WagerCat1",
                "Name": "G2S_paybackPct",
                "Value": 9473,
                "DeviceClass": "G2S_gamePlay",
                "DeviceId": 2
            },
            {
                "Type": "Device",
                "Name": "G2S_cardedWageredPromoAmt",
                "Value": 0,
                "DeviceClass": "G2S_cabinet",
                "DeviceId": 0
            }
        ],
        "TransactionLog": [
            {
                "Type": "Recall",
                "Timestamp": "2021-02-24T20:57:03.597Z",
                "InitialWager": 3000,
                "FinalWager": 3000,
                "InitialWin": 0,
                "SecondaryPlayed": 0,
                "SecondaryWager": 0,
                "SecondaryWin": 0,
                "FinalWin": 0,
                "DenomId": 0,
                "PlayState": "G2S_primaryGameStarted",
                "PlayResult": "G2S_noResult",
                "DeviceClass": "G2S_gamePlay",
                "DeviceId": 2,
                "LogSequence": 7557,
                "TransactionId": 12060
            }
        ],
        "GamePlayId": 2,
```

```
        "EventCode": "G2S_GPE103"
    },
    "TransmitterId": "ATI_WRAITH_025041000001",
    "Timestamp": { "$date": "2021-02-24T20:57:03.878Z" },
    "Counter": { "$numberLong": "282" }
}
```

The following is an example of a CabinetStatusUpdated event:

```
{
    "_id": {
        "$binary": "dwEAANPVf2lFlrdHiQAAEw==",
        "$type": "3"
    },
    "TrackerId": "ATI_RLT_2",
    "Action": "CabinetStatusUpdated",
    "Traits": {
        "TransactionId": 0,
        "DeviceId": 88,
        "EventText": "EGM Disabled - Operator Menu",
        "EventId": 51245,
        "DeviceClass": "G2S_cabinet",
        "EventDateTime": "2021-02-24T20:55:38.005Z",
        "EgmState": "G2S_operatorDisabled",
        "StatusInfo": [{
            "DeviceClass": "G2S_cabinet",
            "DeviceId": 526059076,
            "Status": {
                "Type": "G2S_cabinet",
                "EnableGamePlay": true,
                "EnableMoneyIn": true,
                "HostLocked": false,
                "EgmState": "G2S_operatorDisabled",
                "DeviceClass": "G2S_cabinet",
                "DeviceId": 526059076,
                "GamePlayId": 0,
                "ThemeId": "G2S_none",
                "PaytableId": "G2S_none",
                "DenomId": 0,
                "MaxWagerCredits": 1,
                "ServiceLampOn": false,
                "LogicDoorOpen": false,
                "LogicDoorDateTime": null,
                "AuxDoorOpen": false,
                "AuxDoorDateTime": null,
                "CabinetDoorOpen": false,
                "CabinetDoorDateTime": null,
                "HardMetersDisconnected": false,
                "GeneralFault": false,
                "ReelTilt": false,
                "ReelsTilted": "",
                "VideoDisplayFault": false,
                "StorageFault": false,
                "GeneralMemoryFault": false,
                "EgmIdle": true,
                "LocaleId": "en_US",
                "TimeZoneOffset": "-00:00",
                "ConfigurationId": 0,
                "EgmEnabled": true,
                "HostEnabled": true
            }
        }],
        "EventCode": "G2S_CBE202"
    },
    "TransmitterId": "ATI_WRAITH_025041000001",
    "Timestamp": {
        "$date": "2021-02-24T20:55:38.111Z"
    },
    "Counter": {
        "$numberLong": "19"
    }
}
```

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A system comprising:
a listening device communicably coupled to a plurality of network devices over a first network, the listening device configured to:
subscribe to one or more data types,
receive first data from a first network device in accordance with the subscription, wherein the first data comports with a Serial Attached SCSI (SAS) protocol,
generate a first data package in a form of a first data structure comprising the first data and configuration information related to the first network device, and
transmit the data package across a second network to a collection server,
receive second data from a second network device in accordance with the subscription, wherein the second data comports with a second protocol that differs from the SAS protocol,
generate a second data package in the form of the first data structure comprising the second data and configuration information related to the second network device.

2. The system of claim 1, wherein at least one of the plurality of network devices are communicably connected to an electronic gaming machine (EGM).

3. The system of claim 2, wherein the at least one of the plurality of network devices are configured to:
detect a mechanical button press,
compare the detected button press data with expected button press data, and
in response to a determination that a difference between the button press data and the expected button press data satisfies a threshold, generate a notification
the listening device further configured to:
receive the notification from the at least one network device.

4. The system of claim 3, the listening device further configured to trigger the EGM to perform an action corresponding to the button press.

5. The system of claim 1, wherein at least one of the network devices comprises one or more sensors, and wherein the received data comprises sensor data from the one or more sensors.

6. The system of claim 5, wherein the authentication data provides permission to access an application programming interface (API) for transmission of data from the plurality of network devices.

7. The system of claim 1, wherein the listening devices is further configured to:
obtain, from an authentication server across the second network, authentication data,
wherein the listening device transmits the data package in accordance with the authentication data.

8. A non-transitory computer readable medium comprising computer readable code executable by one or more processors to:
receive first data from a first network device, wherein the first data comports with a Serial Attached SCSI (SAS) protocol,
generate a first data package in a form of a first data structure comprising the first data and configuration information related to the first network device, and
transmit the data package across a second network to a collection server,
receive second data from a second network device, wherein the second data comports with a second protocol that differs from the SAS protocol,
generate a second data package in the form of the first data structure comprising the second data and configuration information related to the second network device.

9. The non-transitory computer readable medium of claim 8, wherein at least one of the plurality of network devices are communicably connected to an electronic gaming machine (EGM).

10. The non-transitory computer readable medium of claim 9, wherein the at least one of the plurality of network devices are configured to:
detect a mechanical button press,
compare the detected button press data with expected button press data, and
in response to a determination that a difference between the button press data and the expected button press data satisfies a threshold, generate a notification,
wherein the computer readable code further comprises computer readable code to:
receive the notification from the at least one network device.

11. The non-transitory computer readable medium of claim 10, further comprising computer readable code to trigger the EGM to perform an action corresponding to the button press.

12. The non-transitory computer readable medium of claim 8, wherein at least one of the network devices comprises one or more sensors, and wherein the received data comprises sensor data from the one or more sensors.

13. The non-transitory computer readable medium of claim 8, further comprising computer readable code to:
obtain, from an authentication server across the second network, authentication data,
wherein the data package is transmitted in accordance with the authentication data.

14. The non-transitory computer readable medium of claim 13, wherein the authentication data provides permission to access an application programming interface (API) for transmission of data from the plurality of network devices.

15. A method comprising:
receiving first data from a first network device, wherein the first data comports with a Serial Attached SCSI (SAS) protocol;
generating a first data package in a form of a first data structure comprising the first data and configuration information related to the first network device; and
transmitting the data package across a second network to a collection server;
receiving second data from a second network device, wherein the second data comports with a second protocol that differs from the SAS protocol; and
generating a second data package in the form of the first data structure comprising the second data and configuration information related to the second network device.

16. The method of claim 15, wherein at least one of the plurality of network devices are communicably connected to an electronic gaming machine (EGM).

17. The method of claim 16, wherein the at least one of the plurality of network devices are configured to:
detect a mechanical button press,
compare the detected button press data with expected button press data, and in response to a determination that a difference between the button press data and the expected button press data satisfies a threshold, generate a notification, the method further comprising:
receiving the notification from the at least one network device.

18. The method of claim 17, further comprising triggering the EGM to perform an action corresponding to the button press.

19. The method of claim 15, wherein at least one of the network devices comprises one or more sensors, and wherein the received data comprises sensor data from the one or more sensors.

20. The method of claim 19, further comprising:
obtaining, from an authentication server across the second network, authentication data,
wherein the data package is transmitted in accordance with the authentication data.

* * * * *